(12) United States Patent
Nishikawa et al.

(10) Patent No.: US 6,580,521 B1
(45) Date of Patent: Jun. 17, 2003

(54) PRINT CONTROL APPARATUS, PRINT CONTROL METHOD AND MEMORY MEDIUM

(75) Inventors: Satoshi Nishikawa, Kawasaki (JP); Koji Nakagiri, Kawasaki (JP); Yasuo Mori, Tokyo (JP); Yasuhiro Kujirai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/123,328

(22) Filed: Jul. 28, 1998

(30) Foreign Application Priority Data

Jul. 30, 1997 (JP) .............................................. 9-218320
Jul. 30, 1997 (JP) .............................................. 9-218321
Jul. 10, 1998 (JP) ............................................. 10-195714

(51) Int. Cl.[7] .............................................. G06F 15/00
(52) U.S. Cl. ..................... 358/1.18; 358/1.15; 358/1.12; 358/296; 358/401
(58) Field of Search ................................ 358/296, 401, 358/449, 450, 451, 1.18, 1.2, 1.1, 1.15, 1.13, 452, 453; 707/527, 526, 525

(56) References Cited

U.S. PATENT DOCUMENTS 4,899,227 A  2/1990 Yamada ..................... 358/452
6,101,513 A * 8/2000 Shakib et al. ............... 707/527

FOREIGN PATENT DOCUMENTS

| EP | 0330343 A2 | 8/1989 | ........... G06F/12/20 |
| EP | 0429049 A2 | 5/1991 | ........... H04N/1/387 |
| EP | 0478970 A2 | 4/1992 | ........... H04N/1/387 |
| EP | 0729118 A2 | 8/1996 | ........... G06T/11/60 |

* cited by examiner

*Primary Examiner*—Edward Coles
*Assistant Examiner*—Twyler Lamb
(74) *Attorney, Agent, or Firm*—Fitzpatrick, Cella, Harper & Scinto

(57) ABSTRACT

There is provided, even in case plural sheet sizes or plural sheet orientations are mixed within a document, a system capable of obtaining an output result close to that of a document not containing such mixed sheet sizes or sheet orientations without causing sheet discharge in the course of printing operation or data overflow from the print area, also providing an enlarging/reducing function to a device lacking such function, and providing a visually agreeable output result, all realized without modification in the conventional printer driver. A host computer is provided with a spool file manager for calculating the relative position of the logic page to the physical page, and a despooler for processing the layout data, obtained by enlarging or reducing the logic page, to a data format matching the graphic engine.

40 Claims, 23 Drawing Sheets

SHEET A

SHEET B

SHEET B

PRINT CONTROL APPARATUS, PRINT CONTROL METHOD AND MEMORY MEDIUM

BACKGROUND OF THE INVENTION

1. Field of the Invention

The present invention relates to a print control apparatus, a print control method and a memory medium therefor, and more particularly to a print control apparatus, a print control method and a memory medium therefor adapted, in the printing in a system provided with an information processing apparatus such as a personal computer and a printer, in case where the printing sheets are mixed in direction or in size within a same document, or in case of enlarged or reduced printing in the above-mentioned system.

2. Related Background Art

In the printing operation with a printer, there is conventionally known a technology, instead of printing the print data of a page on a sheet, of printing the print data of plural pages on a sheet in a reduced manner. Such printing, called N-page printing or N-up printing, is used in various applications such as test printing of a document for editing or layout confirmation, a case of reducing the number of output sheets, or a case of varying the print format such as the font size or layout.

Also in case of enlarged or reduced printing with such conventional system, it has been customary to enlarge or reduce the print data by operating the resolution on a host computer or in the printing device itself if it has such function.

However the conventional technology mentioned above has been associated with the following drawbacks. The conventional N-page printing assumes printing of a document in which all the pages have a same size and a same direction. For this reason, in printing a document of N pages including plural page sizes or plural directions, the sheet is discharged, without printing of N pages, at a point of the change in the page size.

The N-page printing may also be realized without such interim sheet discharge, but, in such case, the print data may overflow from the print area by the change in the page size.

Also in the enlarged or reduced printing in such conventional system, as it has been customary to enlarge or reduce the print data by operating the resolution on a host computer or in the printing device itself if it has such function, the output format of the document may vary in the former case as the print data are reconstructed by the application with the resolution thereof.

Also in the latter case, the enlarged or reduced printing is not possible unless the printing device itself has the above-mentioned function.

Furthermore, the conventional system is not designed to print in a proper position of the sheet in the enlarged or reduced printing. Furthermore, in case the conventional system has a function of printing plural logic pages (pages processed in the application) on a single physical page (actually outputted page), such function is not so designed as to print the print data in an exactly symmetrical position in the horizontal and vertical directions of the sheet.

SUMMARY OF THE INVENTION

In consideration of the foregoing, an object of the present invention is to provide a print control apparatus, a print control method and a memory medium therefor enabling, even in case plural sizes or directions of the sheets are mixed within a same document, to prevent an interim sheet discharge or an overflow of the print data from the print area and to obtain an output result similar to that of a document not containing such mixed sizes or directions of the sheets.

Another object of the present invention is to provide a print control apparatus, print control method and a memory medium therefor capable of providing a device lacking the enlarging/reducing function with such enlarging/reducing function, also enabling the enlarged or reduced printing without changing the content of the original print data, further enabling, in two-side printing, the printing in a same position on both sides of the sheet, and enabling to print the print data in an exactly symmetrical position in the horizontal and vertical directions.

Still another object of the present invention is to provide a print control apparatus, a print control method and a memory medium therefor enabling control to effect the N-up printing with the print data including pages of plural kinds (different for example in the size and direction) with a printer driver corresponding to a printer lacking the conventional N-up printing function or automatic layout function, without newly preparing a portion for generating the PDL (page description language) from the DDI (device driver interface) function outputted from a graphic engine (for example GDI (graphical device interface)).

The above-mentioned objects can be attained, according to the present invention, by a print control apparatus capable of determining the layout on a print sheet, comprising area determination means for determining a print area corresponding to a logic page by dividing a physical page into N (a natural number); enlargement/reduction means for determining the enlargement/reduction rate for each logic page based on the size of each print area and the page information of each logic page and effecting enlargement/reduction with the enlargement/reduction rate corresponding to each logic page; and arrangement means for arranging each logic page thus enlarged or reduced in each print area.

The present invention is featured by further comprising storage means for storing the page information of the logic page, and sheet determination means for determining the sheet size and the sheet direction of the physical page, based on the page size information contained in the page information of the logic page, wherein the enlargement/reduction means is adapted to calculate the enlargement/reduction rate based on the stored page information and the determined sheet size.

The present invention is further featured in that the sheet determination means is adapted to determine an optimum sheet size based on the page information of N pages to be printed on a same sheet.

The present invention is further featured in that the sheet determination means is adapted to determine the sheet size based on an externally entered instruction.

The present invention is further featured in that the sheet determination means is adapted to determine an optimum sheet size, in case of two-side printing, based on the page information of 2N pages to be printed on a same sheet.

The present invention is further featured in that the enlargement/reduction means adopts such an enlargement/reduction rate as to provide a largest image that can be accommodated in each print area without changing the page size and the vertical-horizontal ratio of the original logic data.

The present invention is further featured in that the area determination means is adapted, in case the number N of sheet division is a multiple of 2 but is not a square of a natural number, not to change the direction of the sheet at the area division thereof for a sheet of which the length of the longer side exceeds twice of the length of the shorter side, but to change the sheet direction for a sheet of which the length of the longer side is less that twice of the length of the shorter side.

The present invention is further featured in that it is applicable to a system for effecting the printing operation by transmitting print data from an upper device such as a computer to a printing device such as a printer.

The present invention further comprises storage means for temporarily storing the data in an intermediate code format different from the print data, and preparation for preparing the print data based on thus temporarily stored data.

The above-mentioned objects can also be attained, according to the present invention, by a print control apparatus, comprising dispatcher means for receiving common print information, generated from drawing data generated by an arbitrary application, from drawing means dependent on the operating system; intermediate data conversion means for converting the print information, received by the dispatcher means, into intermediate data and storing such intermediate data in spool means; setting means for effecting designation for assigning N logic pages (N being a natural number) in a physical page; area determination means for determining a print area corresponding to a logic page by dividing the physical page into N and determining the enlargement/reduction rate for each logic page; process means for processing the intermediate data stored in the spool means in such a manner that the logic page is arranged with enlargement or reduction in thus determined print area and outputting the processed data in the drawing data format to the drawing means; and print data generation means for converting the print information, received by the dispatcher means, into print data consisting of control commands and outputting such print data to an external device, and a print control method and a memory medium therefor.

The present invention is also featured in that the drawing data are GDI (graphical device interface).

The present invention is further featured in that print information is DDI (device driver interface).

The present invention is further featured in that he print data is a page description language.

The above-mentioned objects can be further attained, according to the present invention, by a print control apparatus for controlling the printing operation, comprising memory means for storing an effective print area of an input sheet, a size and an effective print area of an output sheet, an offset value and a set enlargement/reduction mode; discrimination means for discriminating the set enlargement/reduction mode; setting means for setting the coordinate of an output device based on the result of discrimination; and print control means for controlling the printing of the stored print data based on such setting, and a print control method and a memory medium therefor.

The present invention is also featured in that it is applicable to a system capable of temporarily storing, in an upper device such as a computer, data of an intermediate code format different from the print data, and effecting the printing by providing a printing device such as printer with print data prepared according to the temporarily stored data.

The present invention is further featured in that the memory means is adapted to temporarily store an effective print area of the input sheet, a size and an effective print area of the output sheet, an offset value and set enlargement/reduction mode as intermediate codes.

The present invention is further featured in that the enlargement/reduction mode includes an enlargement/reduction mode to be designated by the output sheet, an enlargement/reduction mode to be designated by the enlargement/reduction rate, and an enlargement/reduction mode to be designated by the output sheet and the enlargement/reduction rate.

The present invention is further featured in comprising arrangement means for effecting a centering operation to an appropriate print position, based on the effective print area of the input sheet, the size and the effective print area of the output sheet, the offset value and the set enlargement/reduction mode.

The present invention is further featured in that the print control means has a control function of printing plural logic pages on a physical page, the arrangement means is adapted, in such printing, to arrange the plural logic pages in a symmetrical print position in the horizontal and vertical directions.

The present invention is further featured in that the logic page is a page processed in the application and the physical page is an actually printed page.

The above-mentioned objects can be further attained, according to the present invention, by a print control apparatus for determining the layout on a sheet to be printed, comprising dispatcher means for receiving common print information, generated from drawing data generated by an arbitrary application, from drawing means dependent on the operating system; intermediate data conversion means for converting the print information, received by the dispatcher means, into intermediate data and storing such intermediate data in spool means; setting means for setting an enlargement/reduction rate; process means for processing the intermediate data stored in the spool means in such a manner that the logic page is arranged with enlargement or reduction in thus determined print area and outputting the processed data in the drawing data format to the drawing means; and print data generation means for converting the print information, received by the dispatcher means, into print data consisting of control commands and outputting such print data to an external device, and a print control method and a memory medium therefor.

BRIEF DESCRIPTION OF THE DRAWINGS

FIGS. 21A, 21B, 21C, 21D and 21E are views showing the modes of reduced printing in the fifth embodiment of the present invention, wherein FIG. 21A shows the relationship between the input sheet and the effective print area; FIGS. 21B, 21C, 21D and 21E show the relationship between the output sheet and the effective print area;

DETAILED DESCRIPTION OF THE PREFERRED EMBODIMENTS

Figure 1:
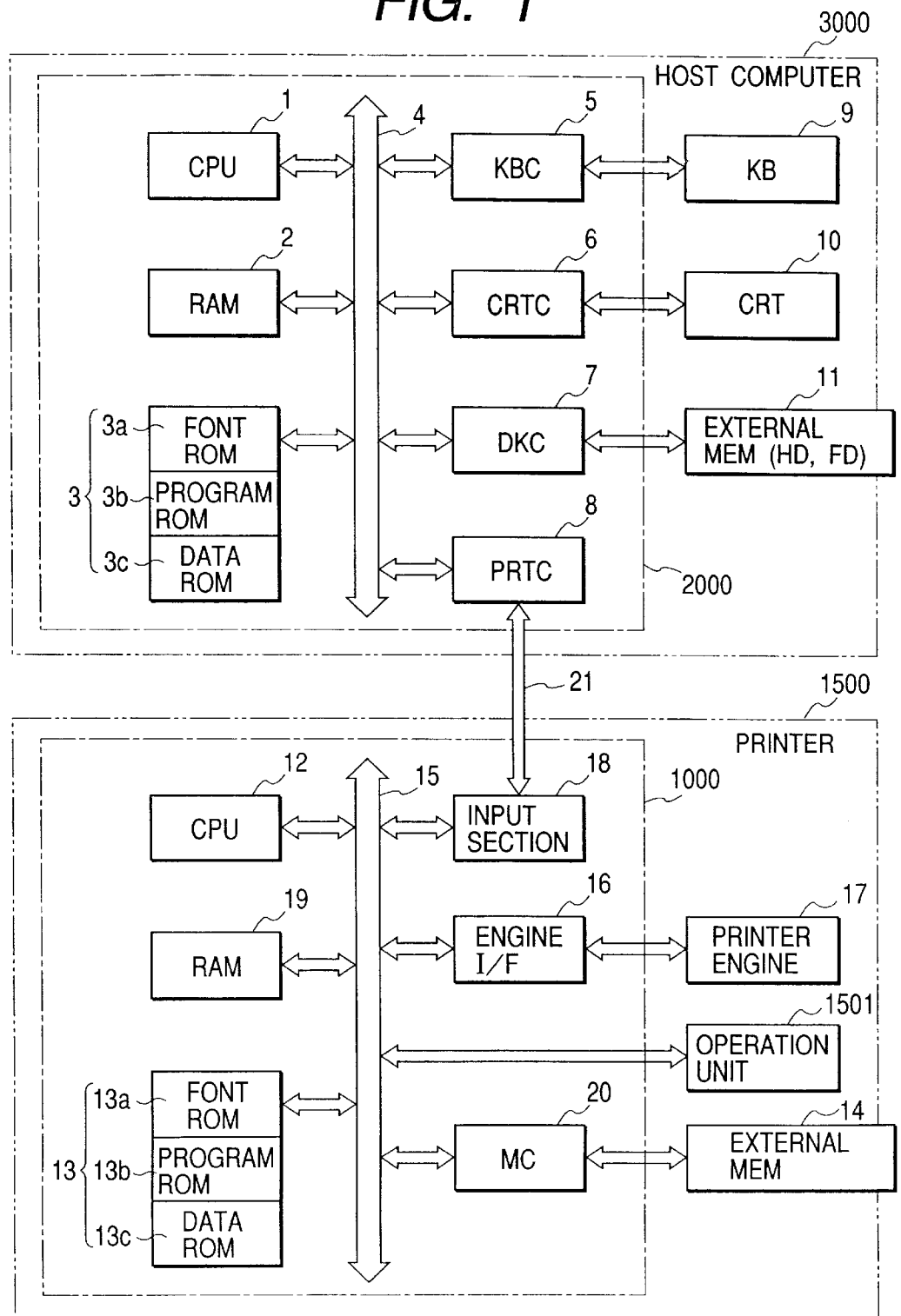
FIG. 1 is a block diagram showing the entire configuration of a printer control system constituting first to sixth embodiments of the present invention.

Now the present invention will be clarified in detail by preferred embodiments thereof, with reference to the attached drawings.

[1] First Embodiment

At first there will be explained, with reference to a block diagram in FIG. 1, the configuration of a printer control system constituting the first embodiment. The present invention is naturally applicable to a single equipment, a system consisting of plural equipment, or a system connected to and executing operations through a network such as LAN (local area network) or WAN (wide area network), as long as the functions of the present invention can be realized.

As a commercial product, the present invention can also be realized as a FD (floppy disk), a CD-ROM (compact disk ROM), or a BBS (bulletin board system; a computer-based message exchange system) such as Internet Web Site or Nifty Serve. In such case, the program of the present invention can be supplied to the printer control system from the FD or the CD-ROM or through the Internet or the Nifty Serve connected to the system.

The printer control system of the first embodiment is composed of a host computer 3000 and a printer 1500. The host computer 3000 is provided with a CPU 1, a RAM 2, a ROM 3, a keyboard controller (KBC) 5, a CRT controller (CRTC) 6, a disk controller (DKC) 7, a printer controller (PRTC) 8, a keyboard (KB) 9, a CRT display (CRT) 10, and an external memory 11. The printer 1500 is provided with a CPU 12, a RAM 19, a ROM 13, an input unit 18, a printer interface (I/F) 16, a memory controller (MC) 20, a printer engine 17, an operation unit 1501, and an external memory 14.

At first there will be explained the configurations of various units of the host computer 3000. The central processing unit (CPU) 1, collectively controlling the devices connected to a system bus 4, executes document processing including graphics, images, characters, tables (including table calculations) etc. based on a document processing program stored in a program ROM 3b (explained later) of the ROM 3. The CPU 1 also executes development (rasterization) of outline font into a display information RAM defined on the RAM 2, thereby enabling WYSIWYG (what you see is what you get) function on the CRT display 10.

Furthermore, the CPU 1 opens various registered windows based on commands designated by a mouse cursor (not shown) or the like on the CRT display 10, thereby executing various data processings. In executing the printing operation with the printer 1500, the user can set the printing process for the printer driver, including the setting of the printer 1500 and the selection of the printing mode, by opening a window relating to the setting of the printing operation.

The RAM 2 functions as a main memory and a work area for the CPU 1. The ROM 3 is provided with a font ROM 3a, a program ROM 3b, and a data ROM 3c. The font ROM 3a or the external memory 11 stores the font data etc. employed in the document processing mentioned above. The program ROM 3b or the external memory 11 stores an operating system (OS) program which is the control program of the CPU 1. The data ROM 3c or the external memory 11 stores various data employed in the above-mentioned document processing.

The keyboard controller (KBC) 5 controls the key input from the keyboard 9 or the pointing device (not shown). The CRT controller (CRTC) 6 controls the display on the CRT display 10. The disk controller (DKC) 7 controls the access to the external memory 11. The printer controller (PRTC) 8 is connected to the printer 1500 through a bidirectional interface 21, and executes the communication control with the printer 1500. The keyboard 9 is provided with various keys.

The CRT display (CRT) 10 displays graphics, images, characters, tables etc. The external memory 11 is composed for example of a hard disk (HD) or a floppy disk (FD) and stores a boot program, various applications, font data, user files, editing files, a printer control command generating program (hereinafter called printer driver) etc.

The CPU 1, RAM 2, ROM 3, keyboard controller (KBC) 5, CRT controller (CRTC) 6, disk controller (DKC) 7, and printer controller (PRTC) 8 are provided on a computer control unit 2000.

In the following there will be explained the various units of the printer 1500. The central processing unit (CPU) 12 collectively controls various devices connected to a system bus 15, and supplies the printer engine 17 with an output image signal, based on a control program stored in the program ROM 13b (explained later) of the ROM 13 or a control program stored in the external memory 14. Also the CPU 12 is capable of communication with the host computer 3000 through the input unit 18, thereby informing the host computer 3000 of the information of the printer 1500.

The RAM 19 functions as a main memory or a work area of the CPU 12 and can expand the memory capacity by an optional RAM (not shown) connected to an expansion port. The RAM 19 is used as an output information developing area, an environmental data storage area and an NVRAM. The ROM 13 is provided with a font RAM 13a, a program ROM 13b and a data ROM 13c. The font ROM 13a is used for storing the font data etc. employed for generating the output information mentioned above. The program ROM 13b stores control program etc. for the CPU 12. The data ROM 13c stores the information utilized on the host computer 3000 in case the external memory 14 such as a hard disk is not connected to the printer 1500.

The input unit 18 executes data exchange between the printer 1500 and the host computer 3000 through the bidirectional interface 21. The printer engine interface (I/F) 16 executes data exchange between the CPU 12 and the printer engine 17. The memory controller (MC) 20 controls the access to the external memory 14. The printer engine 17 executes the printing operation under the control of the CPU 12. The operation unit 1501 is provided with switches for various operations and display means such as an LED display unit.

The external memory 14 is composed for example of a hard disk (HD) or an IC card, and is connected as an option to the printer 1500. The external memory 14 is used for storing font data, an emulation program, form data etc., and is access controlled by the memory controller (MC) 20. The external memory 14 is not limited to one unit but may be provided in plural units. Thus the printer 1500 may be connected to a plurality of optional font cards or external memories storing programs for interpreting printer control languages of different language systems, in addition to the internal fonts. Also there may be provided an NVRAM (not shown) for storing the printer mode setting information from the operation unit 1501.

The CPU 12, RAM 19, ROM 13, input unit 18, printer engine interface 16, and memory controller 20 are provided on a printer control unit 1000.

Figure 2:
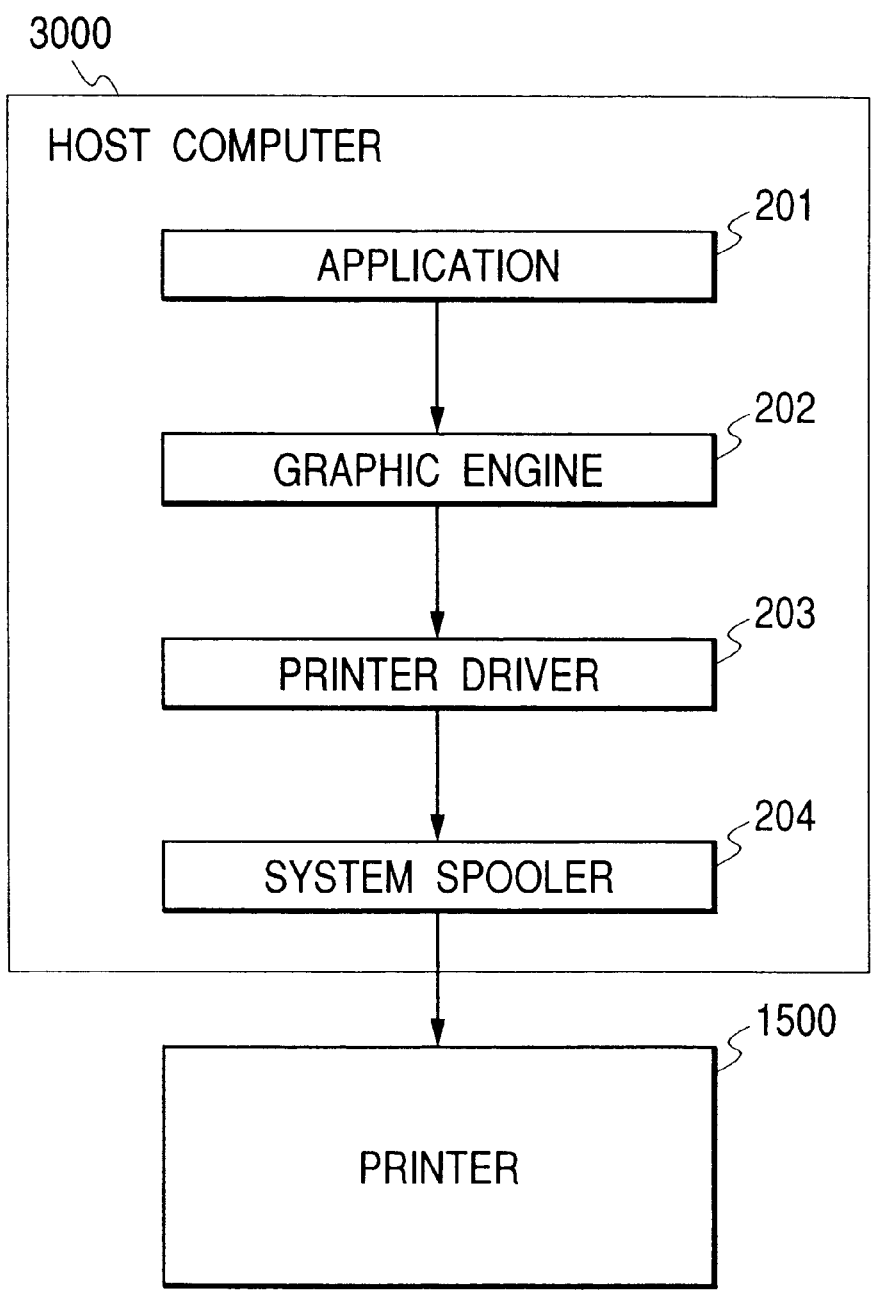
FIG. 2 is a block diagram showing the configuration of a typical printing process in a host computer in the first to sixth embodiments of the present invention.

FIG. 2 is a block diagram showing the configuration of a typical printing process in the host computer 3000 to which the printing device such as a printer is connected either directly or through a network. In FIG. 2, an application 201, a graphic engine 202, a printer driver 203 and a system spooler 204 exist as files stored in the external memory 11 shown in FIG. 1, and constitute program modules to be loaded in the RAM 2 and executed by the operating system or a module utilizing such program modules.

The application 201 and the printer driver 203 may be added to the hard disk constituting the external memory 11, through the floppy disk or the CD-ROM of the external memory 11 or through a network. The application 201 stored in the external memory 11 is loaded in the RAM 2 and executed, but, in executing printing by the printer 1500 from the application 201, output (image drawing) is executed by the graphic engine 202 similarly loaded in the RAM 2 and rendered operable.

The graphic engine 202 similarly loads the printer driver 203, provided for each printing device, into the RAM 2 from the external memory 11, and sets the output of the application 201 to the printer driver 203. It then derives the GDI (graphic device interface) function receives from the application 201 into a DDI (device driver interface) function and outputs the DDI function to the printer driver 203, which executes, based on the DDI function received from the graphic engine 202, conversion into control commands recognizable by the printer, for example PDL (page description language). The converted printer control commands are outputted as the print data to the printer 1500, through the system spooler 204 loaded in the RAM 2 by the operating system and through the interface 21.

Figure 3:
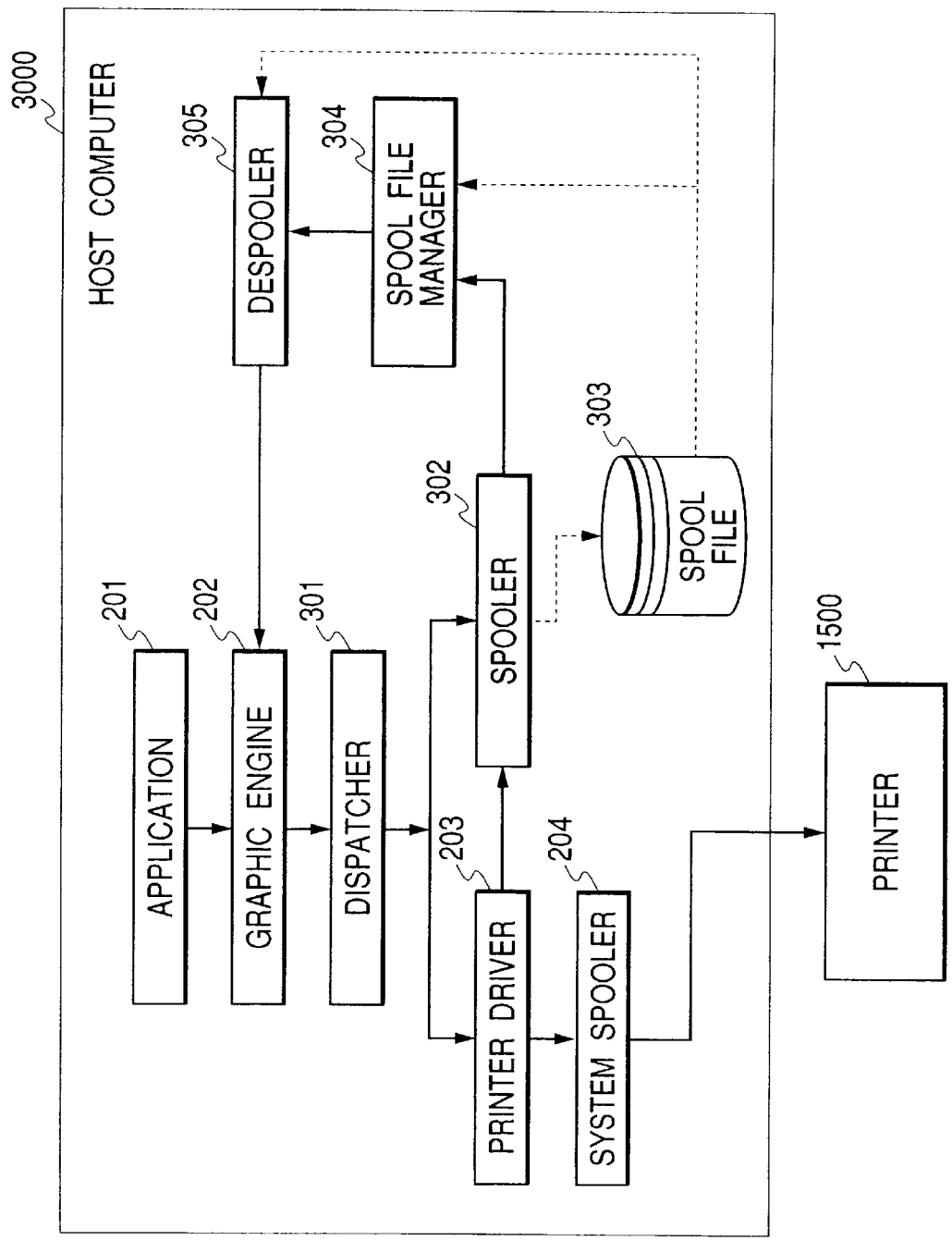
FIG. 3 is a block diagram showing a print data generating method in the first to sixth embodiments of the present invention.

The printer control system of the first embodiment is provided, in addition to the printing system consisting of the printer 1500 and the host computer 3000 shown in FIGS. 1 and 2, with a configuration shown in FIG. 3 for spooling the print data, received from the application, in the form of intermediate code data.

FIG. 3 shows an expansion of the system shown in FIG. 2, wherein, in the transfer of the print commands from the graphic engine 202 to the printer driver 203, a spool file 303 consisting of intermediate codes is once generated. In the system shown in FIG. 2, the application 201 is released from the printing process when the printer driver 203 completes conversion of all the print commands from the graphic engine 202 into the control commands of the printer 1500.

On the other hand, in the system shown in FIG. 3, the application 201 is released from the printing process when the spooler 302 completes conversion of all the print commands into the intermediate code data and output thereof to the spool file 303. Usually the latter takes a shorter time. Also in the system shown in FIG. 3, the content of the spool file 303 can be processed, so that there can be realized, in the print data from the application, functions not provided in the application such as enlargement/reduction or N-up printing of reducing plural pages into a page.

For attaining these objects, the system shown in FIG. 2 is expanded as shown in FIG. 3 for spooling in the intermediate code data. For the processing on the print data, there is ordinarily executed a setting on a window provided by the printer driver 203 and the content of such setting is stored by the printer driver 203 in the RAM 2 or in the external memory 11.

In the following there will be explained the details of the system shown in FIG. 3, wherein, in the illustrated expanded processing method, the print command from the graphic engine 203 is received by a dispatcher 301. If the print command received by the dispatcher 301 from the graphic engine 202 is a print command issued from the application 201 to the graphic engine 202, the dispatcher 301 loads the spooler 302 stored in the external memory 11 in the RAM 2 and sends the print command to the spooler 302 instead of the printer driver 203.

The spooler 302 converts the received print command into an intermediate code and outputs it to the spool file 303. Also the spooler 302 acquires the setting of the process on the print data, set for the printer driver 203, from the printer driver 203 and stores it in the spool file 303. The spool file 303 is generated as a file on the external memory 11, but it may also be generated on the RAM 2. Also the spooler 302 loads a spool file manager 304, stored in the external memory 11, in the RAM 2 and informs the spool file manager 304 of the status of generation of the spool file 303.

Subsequently the spool file manager 304 discriminates whether the printer driver 203 can generates the print data according to the content of the setting of processing on the print data, stored in the spool file 303. The spool file 303 manages the intermediate data in the unit of a logic page outputted by the application. Further, the spool file 203 manages, as explained in the foregoing, the setting of processing (for example setting of the 4-up printing (printing data of 4 pages on the sheet of a page)) set by the user for the printer driver 203. Consequently, the printer driver 203 is judged capable of preparing the print data if all the logic pages necessary based on the setting of processing stored in the spool file 303 are managed by the spool file 303, as all the data required for the preparation of the print data are made available.

In case it is identified that the spool manager 304 can prepare the print data by the printer driver, utilizing the graphic engine 202, the spool manager 304 loads a despooler 305 stored in the external memory 11 in the RAM 2 and instructs the despooler 305 to execute the printing operation of the intermediate data described in the spool file 303. In this operation, the spool file manager 304 also provides the despooler 305 with the information on influence on the logic page resulting from the setting of processing. For example, in case the 4-up printing is set, the spool file manager 304 calculates the positional information indicating the print position of each logic page on the physical page and the size information indicating the size of the logic page on the physical page, and provides the despooler, for each logic page, with the influence information including the positional information and the size information.

The despooler 305 processes the intermediate code, contained in the spool file 303, according to the content of the influence information instructed by the spool file manager 304, and converts the processed intermediate data into a GDI function for supply to the graphic engine 202. The processing of the despooler 305 is executed in the following manner. The despooler 305 recalculates the position and size, in the physical page, of character data to be drawn in the physical page, based on the logic page acquired from the spool file 303 and the influence information acquired from the spool file manager 304. More specifically, for example if the logic page and the physical page has a same sheet size and in case of 4-up printing, the data size is simply multiplied by 1/4. The data position is determined by the despooler 305 by recognizing the position of the logic page assigned by the positional information thereof on the physical page and the position of the data in the logic page in consideration of the fact that the distance is reduced to 1/4. Also, in case the logic page and the physical page have different sheet sizes and in case of N-up printing, the enlargement/reduction ratio is calculated by a calculation to be explained later. The despooler 305 converts the intermediate data, obtained by such processing, into the GDI function for supply to the graphic engine 202.

The graphic engine 202 generates a DDI function from the GDI function received from the despooler 305, and outputs the print command consisting of the DDI function to the dispatcher 301. In case the print command derived from the DDI function received by the dispatcher from the graphic engine 202 is the print command derived from the GDI function issued from the despooler 305 to the graphic engine 202, the despatcher 301 sends the print command to the printer driver 203 instead of the spooler 302. The printer driver 203 generates print data consisting of printer control commands, based on the print command, and outputs such print data to the printer 1500 through a system spooler 204.

Figure 10:
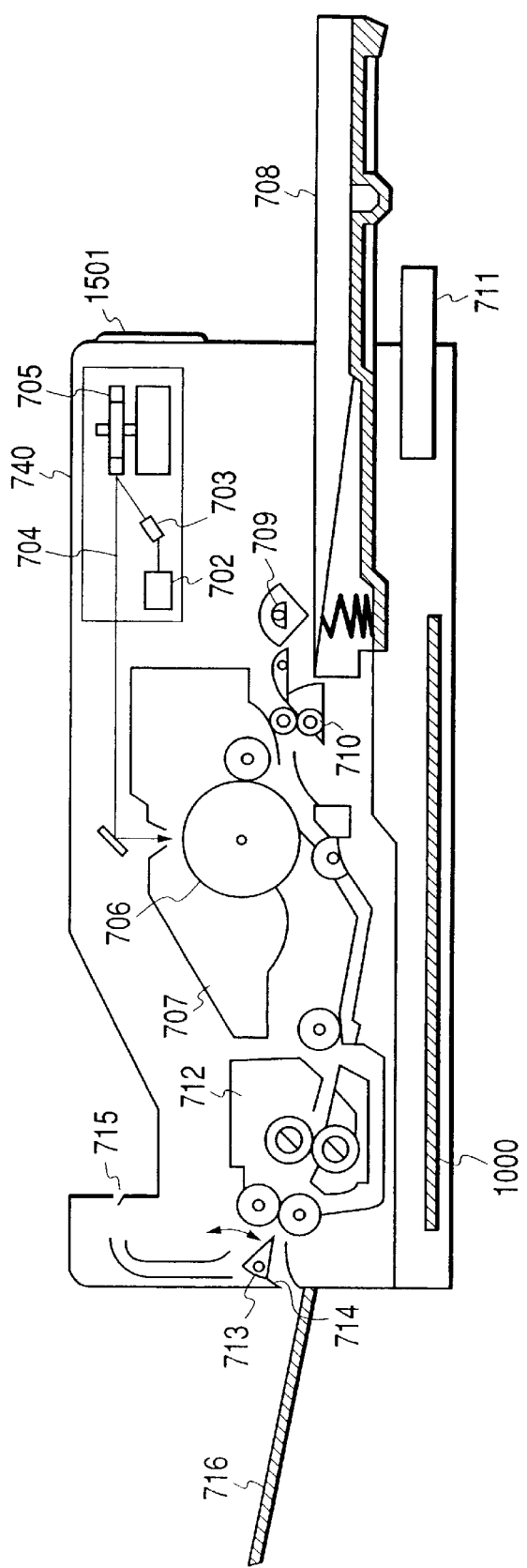
FIG. 10 is a cross-sectional view showing the internal configuration of a printer in the first to sixth embodiment of the present invention.

FIG. 10 is a cross-sectional view showing the internal configuration of a laser beam printer (LBP), constituting an example of the printer 1500 in the first embodiment. The printer 1500 constituted by the LBP can receive character pattern data or the like and can print such data on a recording sheet. The printer 1500 is provided, in a main body 740 for forming an image on the recording sheet based on the supplied printer control commands, with a printer control unit 1000, an operation unit 1501, a laser driver 702, a semiconductor laser 703, a rotary polygon mirror 705, an electrostatic drum 706, a developing unit 707, a sheet cassette 708, a sheet feed roller 709, transport rollers 710, an external memory 711, a fixing unit 712, a switching wedge 713, a face-up discharge unit 714, a face-down discharge unit 715, and a sheet discharge tray 716.

In the following there will be explained the structure of various units together with the functions thereof. The printer control unit 1000 executes control of the entire main body 740 of the LBP and analysis of the character pattern information etc., and mainly converts the printer control commands into a video signal for supply to the laser driver 702. To the printer control unit 1000, there can be connected to the external memory 11 for storing font data and an emulation program of the page description language. The operation unit 1501 is provided, for the above-described operations, with switches and display means (for example an LED display unit).

The laser driver 702 serves to drive the semiconductor laser 703 and executes on-off switching a laser light 704 emitted from the semiconductor laser 703 according to the entered input signal. The semiconductor laser 703 emits the laser light toward the rotary polygon mirror 705, which deflects the laser light in the lateral direction, thereby scanning the electrostatic drum 706. In response to the scanning with the laser light 704, an electrostatic latent image corresponding to the character pattern is formed on the drum surface.

The developing unit 707 is provided along the periphery of the electrostatic drum 706 and serves to develop the electrostatic latent image. The developed image is transferred onto the recording sheet. The sheet cassette 708 contains cut recording sheets as the recording sheets. The sheet feed roller 709 and the transport roller 710 sends the cut recording sheet from the sheet cassette 708 into the main body 740 of the LBP and feeds it to the electrostatic drum 706. The cut recording sheet may also be supplied from a manual insertion tray (not shown) provided above the cover of the sheet cassette 708.

The fixing unit 712 heats the toner image, transferred onto the cut recording sheet, thereby fixing the image to the sheet. The cut recording sheet bearing the fixed image is discharged, in case the switching wedge 713 is shifted upward, from the face-up discharge unit 714 with the recording face upward to the sheet discharge tray 716, but, in case the switching wedge 713 is shifted downward, from the face-down discharge 715 with the recording face downward to the sheet discharge tray 716.

Figure 11:
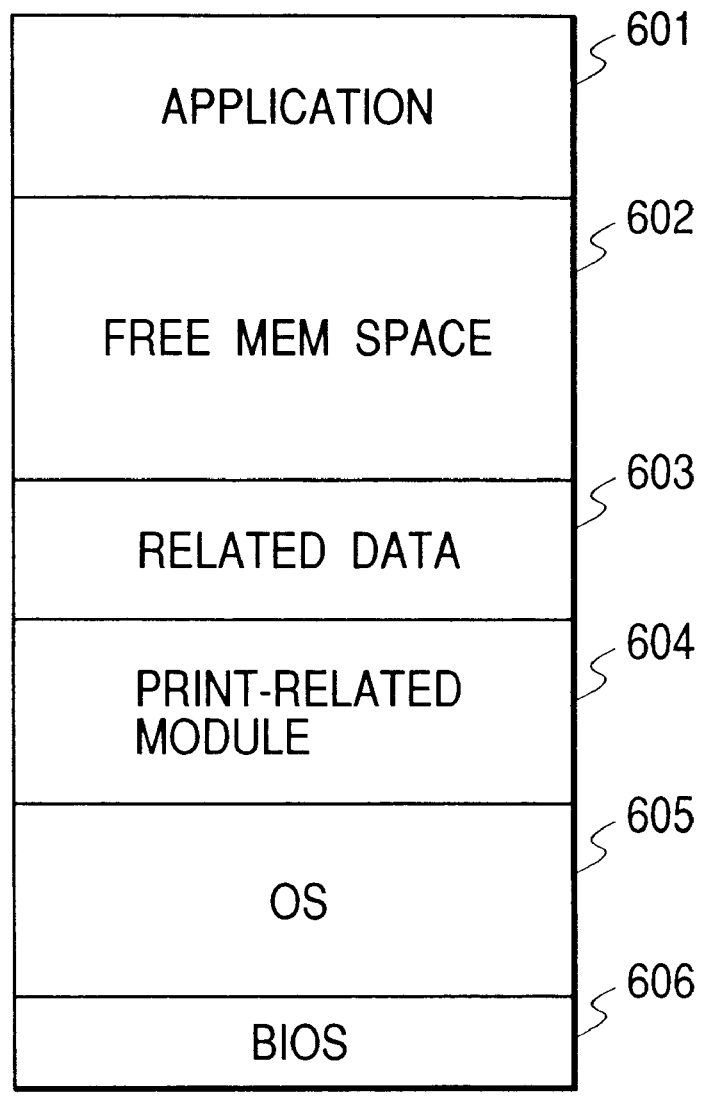
FIG. 11 is a view showing a memory map in a state in which a printing related module including a print mode auto control program of the first to sixth embodiments of the present invention is loaded on a RAM of the host computer and is rendered operable.

FIG. 11 is a memory map in a state in which modules including the print mode control program in the printer control system embodying the present invention are loaded in the RAM 2 of the host computer 3000 and are rendered operable. More specifically, in the RAM 2 there are provided an application 601, an empty memory space 602, related data 603, a printing-related module 604, an operating system (OS) 605, a BIOS (basic input/output system: a program executing most basic processes in the input/output interface) program 606.

In the following there will be explained in detail, with reference to flow charts in FIGS. 4 to 7, the process of the despooler 305, that in an N-page printing and that of sheet determination in the N-page printing, in the printer control system of the above-described first embodiment.

Figure 4:
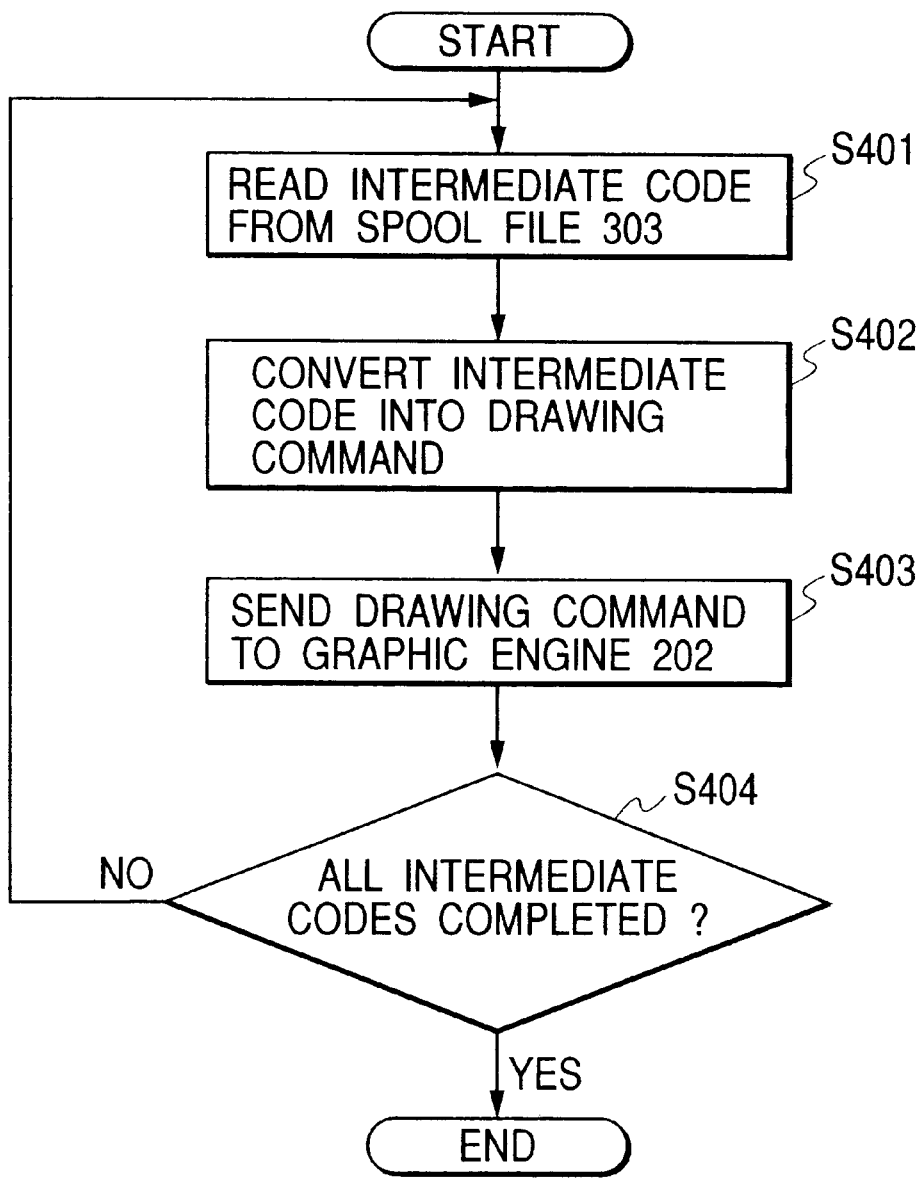
FIG. 4 is a flow chart showing the process sequence in a despooler in a first embodiment of the present invention.

FIG. 4 shows a flow chart outlining the process of the despooler 305 of processing the intermediate code contained in the spool file 303 according to the content of the setting of processing contained in the spool file 303 and outputting the process code through the graphic engine 202. There are in face executed various processes according to the content of processing, but FIG. 4 shows the basic flow not dependent on the content of processing.

At first, in a step S401, the despooler 305 reads the process setting and the input page data from the spool file 303. The data reading method may also be varied according to the content of the processing, in order to optimize the printing speed or reduce the required memory. As an example, if the process setting designates inverted-order printing (printing with inverted order of pages), the input page data may be read from the data of the last page.

Then, in a step S402, the despooler 305 executes processing according to the content of the process setting. If a particular process setting does not exist, it simply converts the intermediate code into the GDI function which is the input format of the graphic engine 202. If there is designated a process setting such as margin attaching, an enlargement or a reduction, there is also executed a displacement of the coordinate according to the designated margin or a conversion of the coordinate system according to the enlargement/reduction ratio. Then a step S403 transmits the code in the input format of the graphic engine 202 to the graphic engine 202. Then, if a step S404 identifies another intermediate code to be converted, the sequence returns to the step S401 for continuing the process. In the absence of the intermediate code to be converted, the present process is terminated.

The flow in FIG. 4 merely shows the outline of the process. Therefore, there naturally exist variations in the actual execution. For example, if the step S401 reads the intermediate codes in collective manner, the steps S402 and S403 explained above are repeated on the collectively read intermediate codes and the sequence returns to the step S401 after the read intermediate codes are processed.

Figure 5:
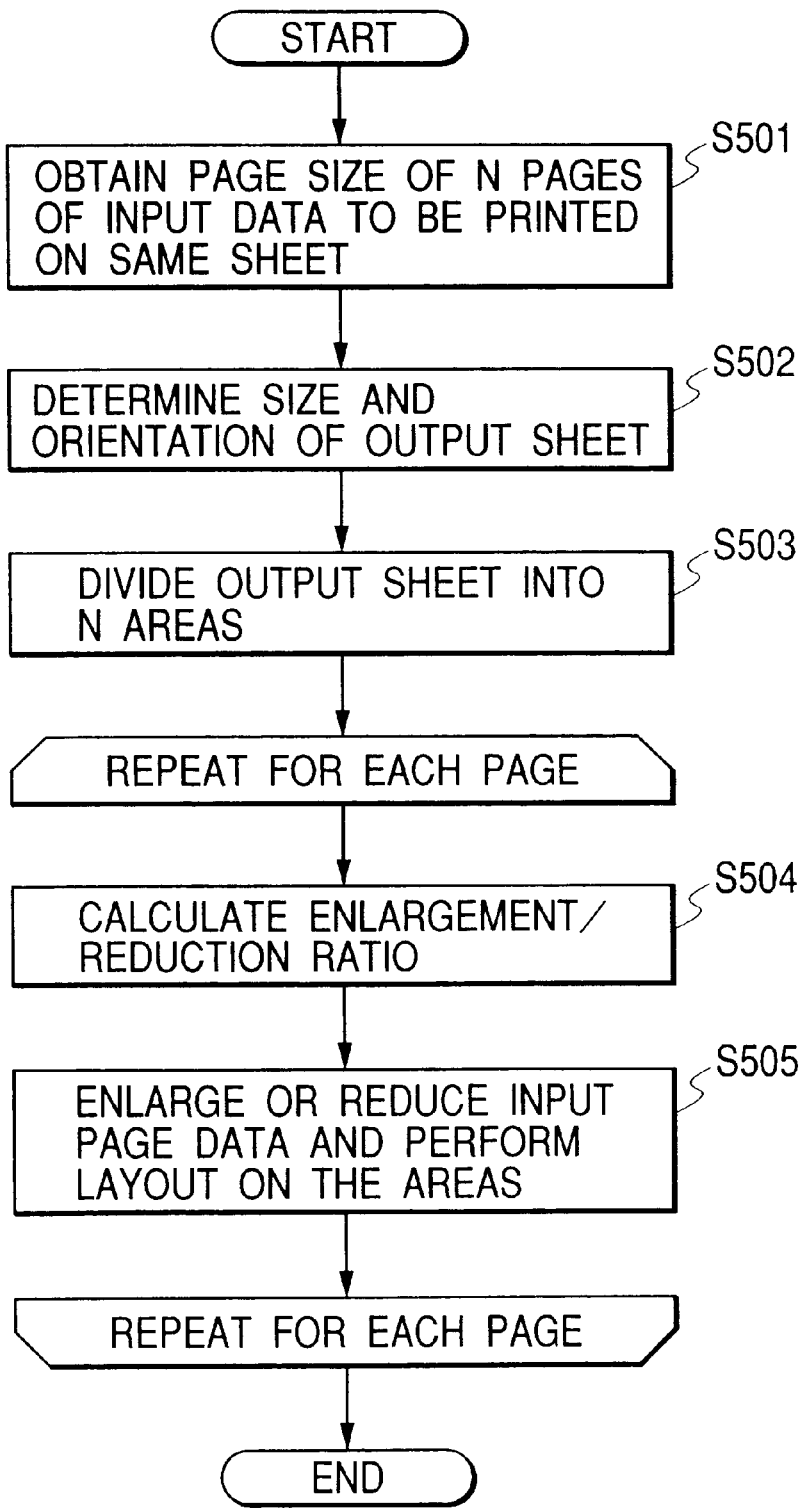
FIG. 5 is a flow chart showing the process sequence of an N-page printing in the first embodiment of the present invention.

FIG. 5 is a flow chart outlining the portion specific to the present invention in the various processes executed in the step S402 in FIG. 4 according to the process setting.

At first the despooler 305 in a step S501 read the size information of the N input pages, and, in a step S502, determines the output sheet and the orientation thereof for printing the input data of N pages. The method of determining the output sheet varies according to the output format. For example, in case of determining the output sheet in consideration of both sides thereof, for example in the two-side N-page printing, it is necessary to read the size information of the 2N input pages and to determine the output sheet from the size information of the 2N input pages.

On the other hand, the step S502 may be dispensed with if the output sheet need not be changed on the way. For example, if the output sheet size has to be fixed with a sheet size designated by the user as in the case of fixed enlargement/reduction, the output size is not determined from the input sheet size but by the sheet size designated by the user.

Then, in a step S503, the despooler 305 divides the output sheet size, determined in the step S502, into N. However, as a mere N division of the output sheet size generates unprintable portions in relation to the effective print area, the N division is executed on the effective print area of the sheet determined from the sheet size information. Then, in a step S504, the despooler 305 determined the enlargement/reduction ratio for positioning the data in the N-divided area. The effective print area is determined for each printer and can be easily obtained by an inquiry to the printer driver 203.

Image positioning in the N-divided area can be achieved by selecting, for the height H and width W of the N-divided area and the height h and width w of the input page size (logic page size in this case), the smaller one of the ratios W/w and H/h and calculating the sized on the value of the smaller ratio. As a specific example, if the N-divided area has a height and a width of (20, 10) while the input logic page size has a height and a width of (50, 30), the ratios 20/50 and 10/30 are compared and the smaller ratio 10/30 is selected, and this ratio 1/3 is multiplied on the logic page size to obtain an input page size of (50/3, 10). An enlargement/reduction ratio closer to the divided area can be obtained by selecting, instead of the sheet size, the effective print area of the logic page or the circumscribed rectangle of the actually drawn data as the input page size. Thereafter, in a step S505, the despooler 305 layouts the enlarged/reduced input page data in the area.

In the foregoing description, the despooler 305 determines the layout position and the enlarged/reduced size for all the logic pages, but such operation is not restrictive and such process may be executed by the spool file manager 304 while the despooler 305 executes the processing of the intermediate data for layout.

In contrast to the conventional N-page printing in which a same enlargement/reduction ratio is employed for all the pages, the first embodiment of the present invention is featured by being capable of employing different enlargement/reduction ratios for the input pages, and the step S504 in FIG. 5 determines the enlargement/reduction ratio for each input page.

Figure 6:
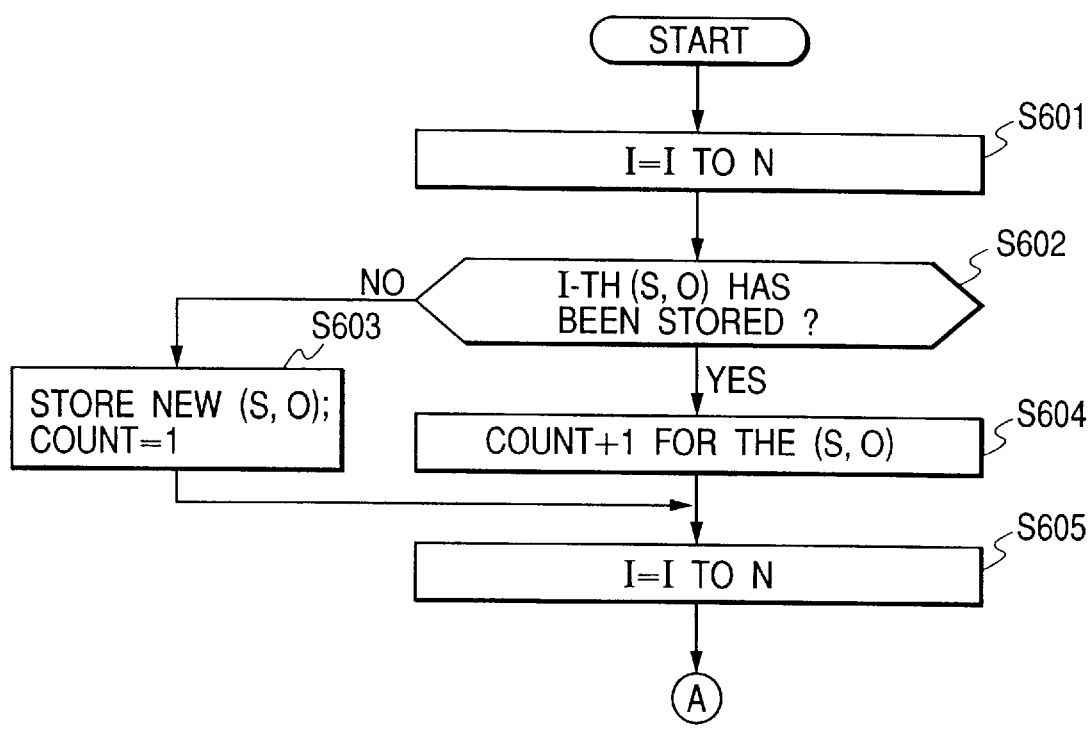
FIGS. 6 and 7 are flow charts showing examples of sheet determining process in the N-page printing in the first embodiment of the present invention.
Figure 7:
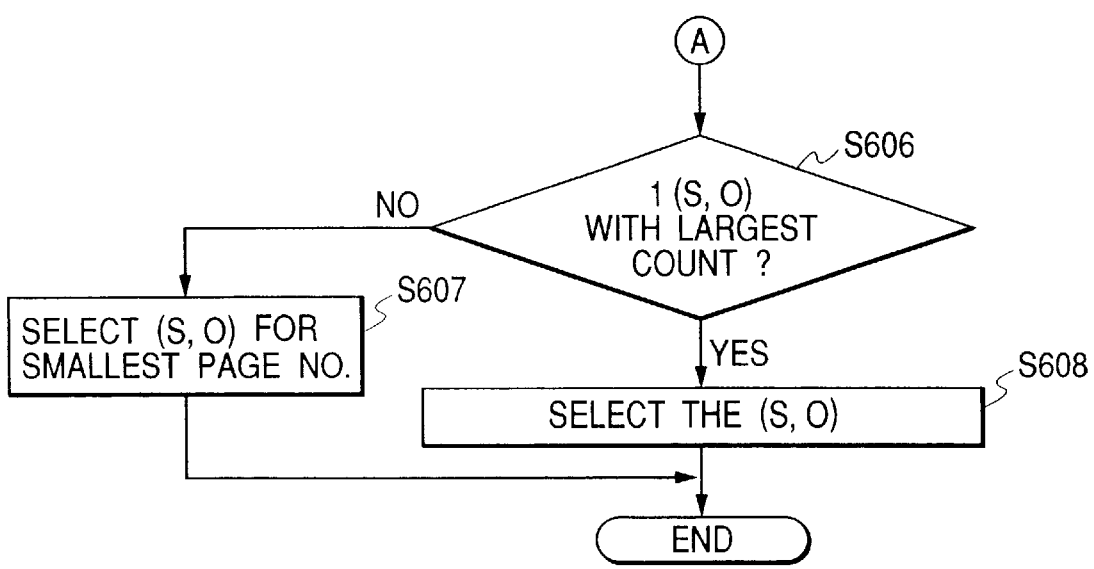

FIGS. 6 and 7 are flow charts showing an example of the output sheet size determining method in the step S502 in FIG. 5.

Steps S602 to S604 are repeated from 1 to N (steps S601 to S605). At first, in a step S602, the despooler 305 discriminates whether a set (S, O) of the input sheet S and the orientation O of an I-th (I=O–N) input sheet has been memorized, and, if not, a step S603 memorizes the set (S, O) a new and sets a count 1. On the other hand, if memorized, the despooler 305 in a step S604 executes an increment of the count of the set (S, O).

After the steps S601–S605 explained above, the despooler 305 in a step S606 discriminates whether there is only one set (S, O) having the largest count, and, if not, a step S607 determines the set employed in the youngest page in the sets (S1, O1), (S2, O2) . . . having the largest count, for determining the output sheet and the orientation thereof. On the other hand, if there is only one set (S, O) having the largest count, the despooler 305 in a step S608 determines such set (S, O) for determining the output sheet and the orientation thereof.

As an example, in case of 4-page printing of a document consisting of 4 pages which are (A4 portrait), (B4 landscape), (B4 landscape) and (A4 portrait) in the order from the first page, the sequence proceeds to the step S607 since both (A4 portrait) and (B4 landscape) have a same count 2, and, as the youngest number of (A4, portrait) is 1 while that of (B4 landscape) is 2, the (A4 portrait) employed in the younger number is selected for determining the sheet size and the orientation thereof.

Figure 8:
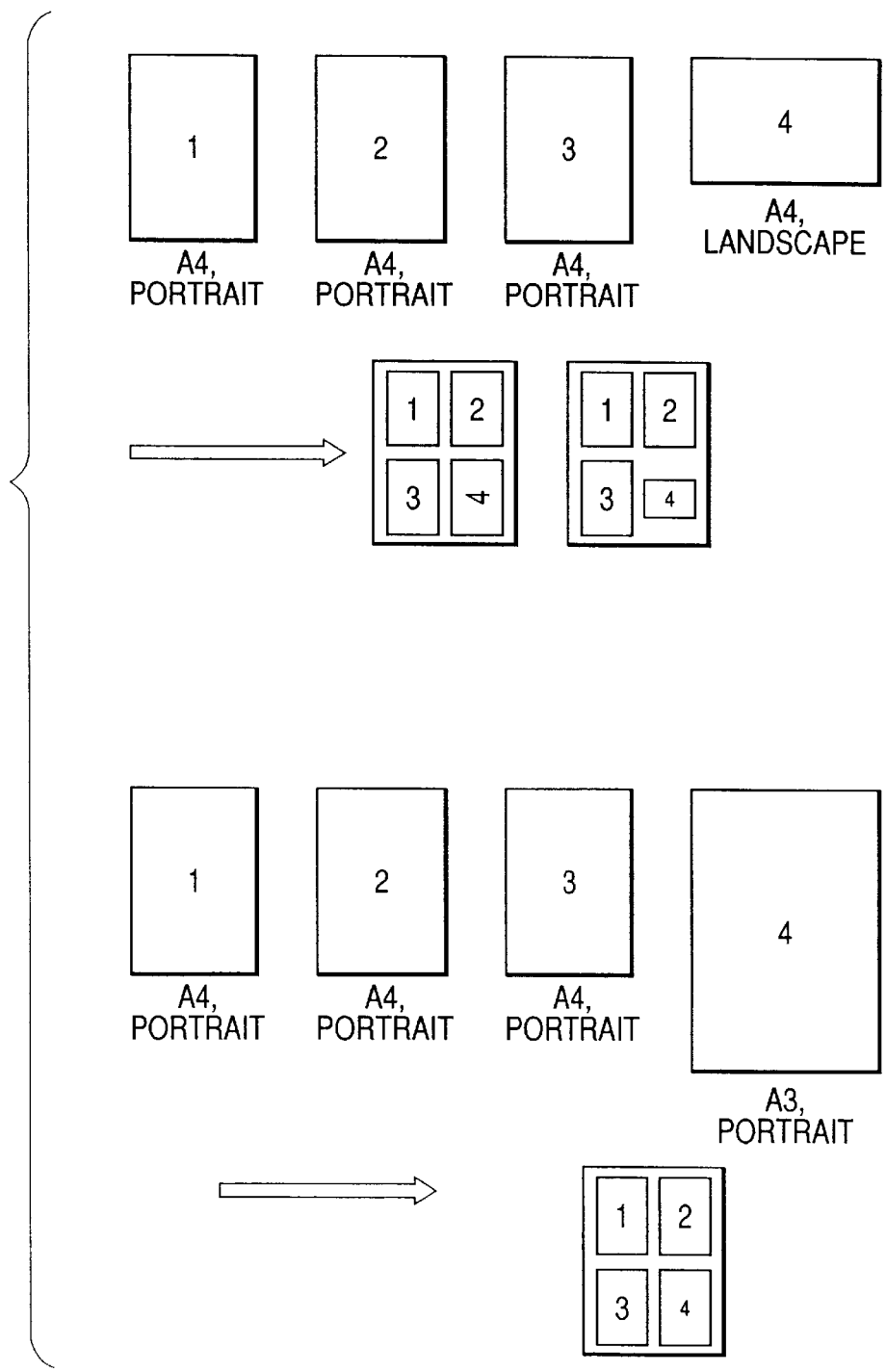
FIG. 8 is a view showing examples of output result in the N-page printing (N=4) in the first embodiment of the present invention.

FIG. 8 shows examples of output of N-page printing (N=4) in the first embodiment. The first example shows a case containing plural orientations of the sheet. The first example shows a case containing plural orientations of the sheet. The sheets are in A4 size but have different orientations. As there are 3 pages of (A4 portrait) and 1 page of (A4 landscape), there are selected the size and orientation of (A4 portrait), and the fourth page alone different in orientation is printed with an enlargement/reduction ratio or an orientation different from that of other 3 pages. The second example shows a case including different sheet sizes. As there are 3 pages of (A4 portrait) and 1 page of (A3 portrait), there are selected the (A4 portrait) sheet, and the fourth page of A3-sized sheet is printed with a reduction ratio enlargement/reduction ratio different from that of other 3 pages.

As explained in the foregoing, the printer control system of the first embodiment is provided with the despooler 305 for determining the sheet size and sheet orientation based on the page size information of the print data, determining the print area by dividing the sheet into N (natural number), effecting enlargement or reduction with the enlargement/reduction ratio independent for each page data, based on the size of each print area and the size of each page data, and arranging the enlarged/reduced page data in each print area, whereby the N-page printing can be achieved without sheet discharge in the course of printing or data overflow from the print area at the change of the sheet size or the sheet orientation, even in case the data for N-page printing have different sheet sizes or different sheet orientations within a document. Consequently there can be obtained an output result close to that of the document which does not contain plural sheet sizes or plural sheet orientations.

[2] Second Embodiment

The printer control system of the second embodiment is composed, as in the first embodiment, of a host computer 3000 provided with a CPU 1, a RAM 2, a ROM 3, a keyboard controller (KBC) 5, a CRT controller (CRTC) 6, a disk controller (DKC) 7, a printer controller (PRTC) 8, a keyboard (KB) 9, a CRT display (CRT) 10, and an external memory 11, and a printer 1500 provided with a CPU 12, a RAM 19, a ROM 13, an input unit 18, a printer interface (I/F) 16, a memory controller (MC) 20, a printer engine 17, an operation unit 1501, and an external memory 14 (cf. FIG. 1). In the second embodiment, the control by the host computer 3000 for generating the print data (cf. FIG. 2), the control with the expanded configuration for generating the print data (cf. FIG. 3) and the internal configuration of the printer 1500 (cf. FIG. 10) are similar to those in the first embodiment and will not, therefore, be explained further. Also in the second embodiment, there can be executed processes same as those in the first embodiment.

Figure 9A:
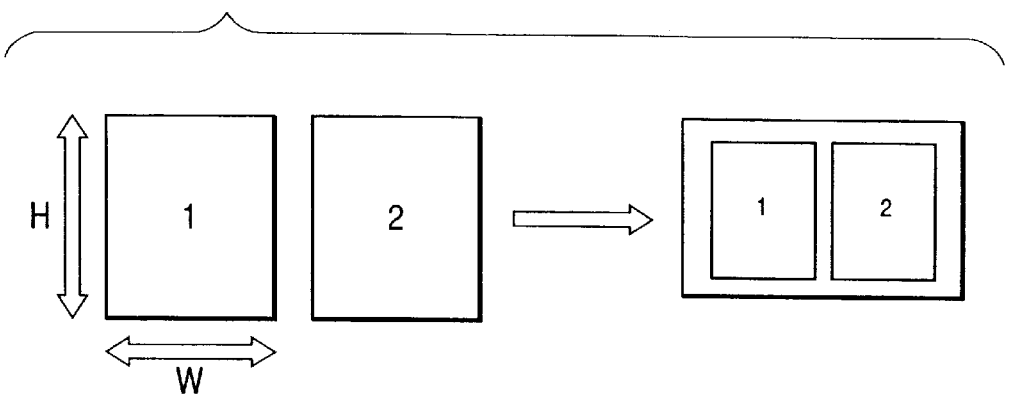
FIGS. 9A, 9B and 9C are views showing examples of sheet division in a second embodiment of the present invention.
Figure 9B:
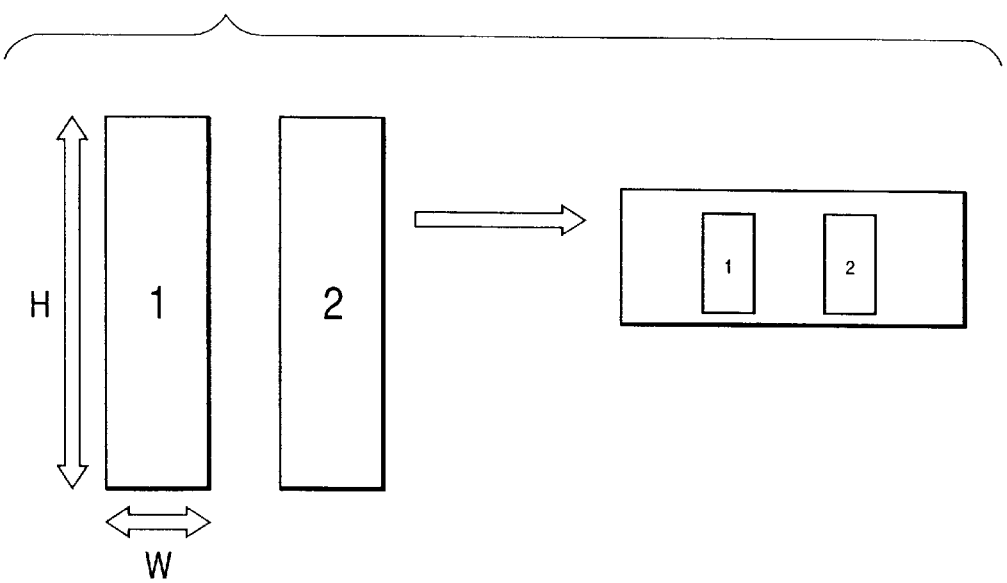
Figure 9C:
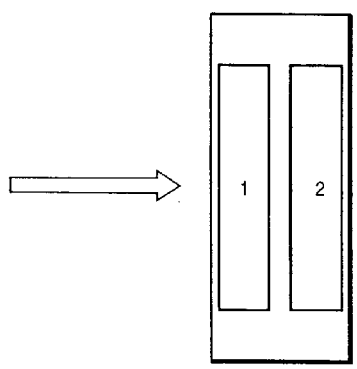

FIGS. 9A to 9C show examples of sheet division in the second embodiment. In the N-page printing, if N is represented by the square of a natural number I (N=4, 9, 16, . . . ), the sheet can be divided by I in the vertical and horizontal direction, but, the division is also conducted in case N cannot be represented as a square, for example N=2 or N=8. In such case, the sheet orientation is changed that of the input pages. For example in case of N=2, a sheet (A4, portrait) for example is changed to (A4, landscape), and the input pages are arranged in reduced manner by dividing the horizontal side, constituting the longer side of the output sheet into two (cf. FIG. 9A).

However, for a sheet of which longer side is more than twice of the shorter side, the longer side after the division into two is still longer than the shorter side (cf. FIG. 9B) so that a larger divided area can be obtained by printing without changing the sheet orientation. Consequently, after the determination of the output sheet, there is checked the height/width ratio of the output sheet, and, if the longer side after division into two is same as or longer than the shorter side, the printing is made without changing the sheet orientation (cf. FIG. 9C).

As explained in the foregoing, the printer control system of the second embodiment, in case the sheet division number N is a multiple of 2 and is not the square of a natural number, does not change the sheet orientation at the sheet division for a sheet of which the longer side is at least equal to twice of the shorter side, but changes the sheet orientation for a sheet of which the longer side is less than twice of the shorter side, whereby a larger divided area can be obtained and the printing can be made with a larger size, even on an elongated sheet having the longer side equal to or larger than twice of the shorter side.

[3] Third Embodiment

The printer control system of the third embodiment is composed, as in the first embodiment, of a host computer 3000 provided with a CPU 1, a RAM 2, a ROM 3, a keyboard controller (KBC) 5, a CRT controller (CRTC) 6, a disk controller (DKC) 7, a printer controller (PRTC) 8, a keyboard (KB) 9, a CRT display (CRT) 10, and an external memory 11, and a printer 1500 provided with a CPU 12, a RAM 19, a ROM 13, an input unit 18, a printer interface (I/F) 16, a memory controller (MC) 20, a printer engine 17, an operation unit 1501, and an external memory 14 (cf. FIG. 1). In the third embodiment, the control by the host computer 3000 for generating the print data (cf. FIG. 2), the control with the expanded configuration for generating the print data (cf. FIG. 3) and the internal configuration of the printer 1500 (cf. FIG. 10) are similar to those in the first embodiment and will not, therefore, be explained further. Also in the third embodiment, there can be executed processes same as those in the foregoing embodiments.

In the third embodiment, the layout method of the present invention is made applicable even in case of N=1. The step S606 in FIG. 7 does not employ (S, O) as the sheet size but designates (A4, O) as the output sheet and the orientation, and the step S503 in FIG. 5 executes 1 division, namely not division, of the output sheet. Thereafter the step S504 executes printing with a largest enlargement/reduction ratio in the effective print area of the A4-sized sheet without changing the height/width ratio of the data of the input page.

This process allows the printing on the A4-sized sheet with such a largest enlargement/reduction ratio that the original data do not overflow nor changes in the height/width ratio, regardless whether the document consists of sheets of a same size (A3, portrait) or of different sizes.

As explained in the foregoing, in the printer control system of the third embodiment, the layout control of the foregoing first embodiment is made applicable also in case of 1 division (no division) of the output sheet, so that the printing can be achieved on the given sheet with such a largest enlargement/reduction ratio that the original data do not overflow from the print area of the sheet nor changes in the height/width ratio, regardless whether the sheet constituting the document have a same size or have mixed sizes.

[4] Fourth Embodiment

The printer control system of the fourth embodiment is composed, as in the first embodiment, of a host computer 3000 provided with a CPU 1, a RAM 2, a ROM 3, a keyboard controller (KBC) 5, a CRT controller (CRTC) 6, a disk controller (DKC) 7, a printer controller (PRTC) 8, a keyboard (KB) 9, a CRT display (CRT) 10, and an external memory 11, and a printer 1500 provided with a CPU 12, a RAM 19, a ROM 13, an input unit 18, a printer interface (I/F) 16, a memory controller (MC) 20, a printer engine 17, an operation unit 1501, and an external memory 14 (cf. FIG.

1). In the fourth embodiment, the control by the host computer 3000 for generating the print data (cf. FIG. 2), the control with the expanded configuration for generating the print data (cf. FIG. 3) and the internal configuration of the printer 1500 (cf. FIG. 10) are similar to those in the first embodiment and will not, therefore, by explained further. Also in the fourth embodiment, there can be executed processes same as those in the first to third embodiments.

The fourth embodiment allows to use the layout method of the present invention in combination with another layout method of the present invention in combination with another layout method. For example, it is assumed that a margin is obtained by a parallel displacement of the entire print data in a designated direction by an amount designated by a parameter (such method is most common for margin setting). The layout method of the present invention may be combined with such margin setting by, in the step S505 in FIG. 5, executing a parallel displacement of the print data corresponding to the margin, after or simultaneously with the enlargement, reduction or layout of the print data.

As explained in the foregoing, in the printer control system of the fourth embodiment, the layout control of the foregoing first embodiment is made applicable also in case, for example, of setting a margin on the sheet, whereby the N-page printing can be achieved without sheet discharge in the course of printing or data overflow from the print area at the change of the sheet size or the sheet orientation, even in case the data for N-page printing have different sheet sizes or different sheet orientations within a document. Consequently there can be obtained an output result close to that of the document which does not contain plural sheet sizes or plural sheet orientations.

[5] Fifth Embodiment

The printer control system of the fifth embodiment is composed, as in the first embodiment, of a host computer 3000 provided with a CPU 1, a RAM 2, a ROM 3, a keyboard controller (KBC) 5, a CRT controller (CRTC) 6, a disk controller (DKC) 7, a printer controller (PRTC) 8, a keyboard (KB) 9, a CRT display (CRT) 10, and an external memory 11, and a printer 1500 provided with a CPU 12, a RAM 19, a ROM 13, an input unit 18, a printer interface (I/F) 16, a memory controller (MC) 20, a printer engine 17, an operation unit 1501, and an external memory 14 (cf. FIG. 1). In the fifth embodiment, the control by the host computer 3000 for generating the print data (cf. FIG. 2), the control with the expanded configuration for generating the print data (cf. FIG. 3) and the internal configuration of the printer 1500 (cf. FIG. 10) are similar to those in the first embodiment and will not, therefore, be explained further. Also in the fifth embodiment, there can be executed processes same as those in the first to third embodiments.

In the fifth embodiment, in case an enlargement/reduction is instructed from the outside, the host computer generates processed print data based on the designated enlargement/reduction ratio, whereby the enlargement/reduction process is made possible even if the printer is not provided with such enlargement/reduction function.

The processes in the printer control system of the fifth embodiment will be explained in the following with reference to flow charts in FIGS. 12 to 20.

Figure 12:
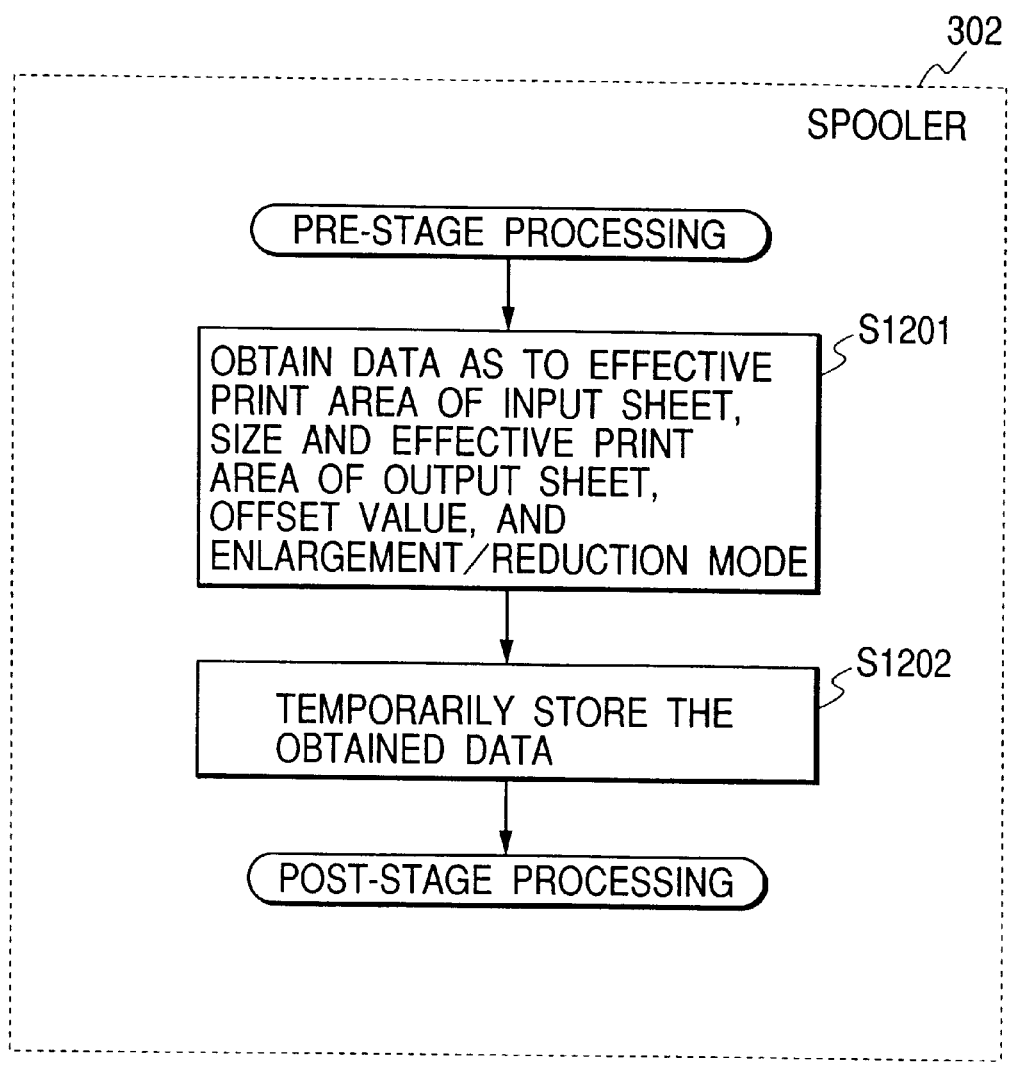
FIG. 12 is a flow chart showing a spooler process in a fifth embodiment of the present invention.

FIG. 12 is a flow chart showing the process flow in the spooler 302. At first, when a print command is sent from the dispatcher 301 to the spooler 302, there is executed an acquisition (step S1201) of the effective print area of the input sheet, the size of the output sheet, the effective print area of the output sheet, the offset value and the set enlargement/reduction mode, in order to the system to realize, through the printer driver, the enlarged/reduced printing set by the user. This process is achieved by acquiring these set values from the printer driver, among the parameters transmitted by the acquisition command or through the dispatcher 301.

Then executed is the temporary storage of the effective print area of the input sheet, the size of the output sheet, the effective print area of the output sheet, the offset value and the set enlargement/reduction mode (step S1202). This is achieved by storing thus acquired various data in the spool file 303. In this manner there can be provided data, required in the despooler 304 for enlargement/reduction at the reproduction of the print data. The acquisition and temporary storage of other data required for printing are to be executed in a pre-processing or a post-processing shown in FIG. 12. Thereafter the despooler 304 executes conversion of the intermediate data format into the GDI function format for generating the print data as explained in the foregoing.

Figure 13:
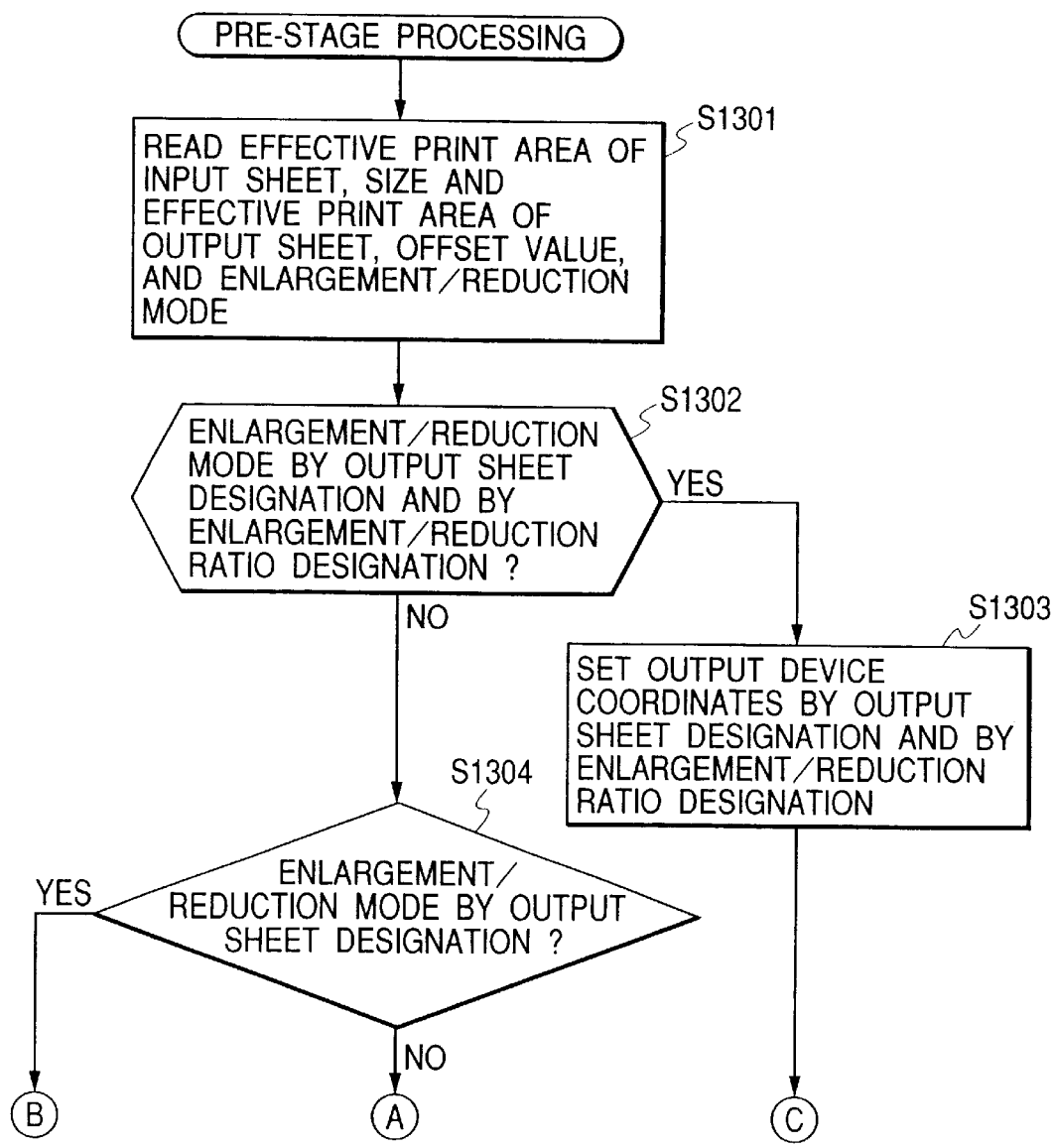
FIGS. 13 and 14 are flow charts showing an enlargement/reduction process in the fifth embodiment of the present invention.
Figure 14:
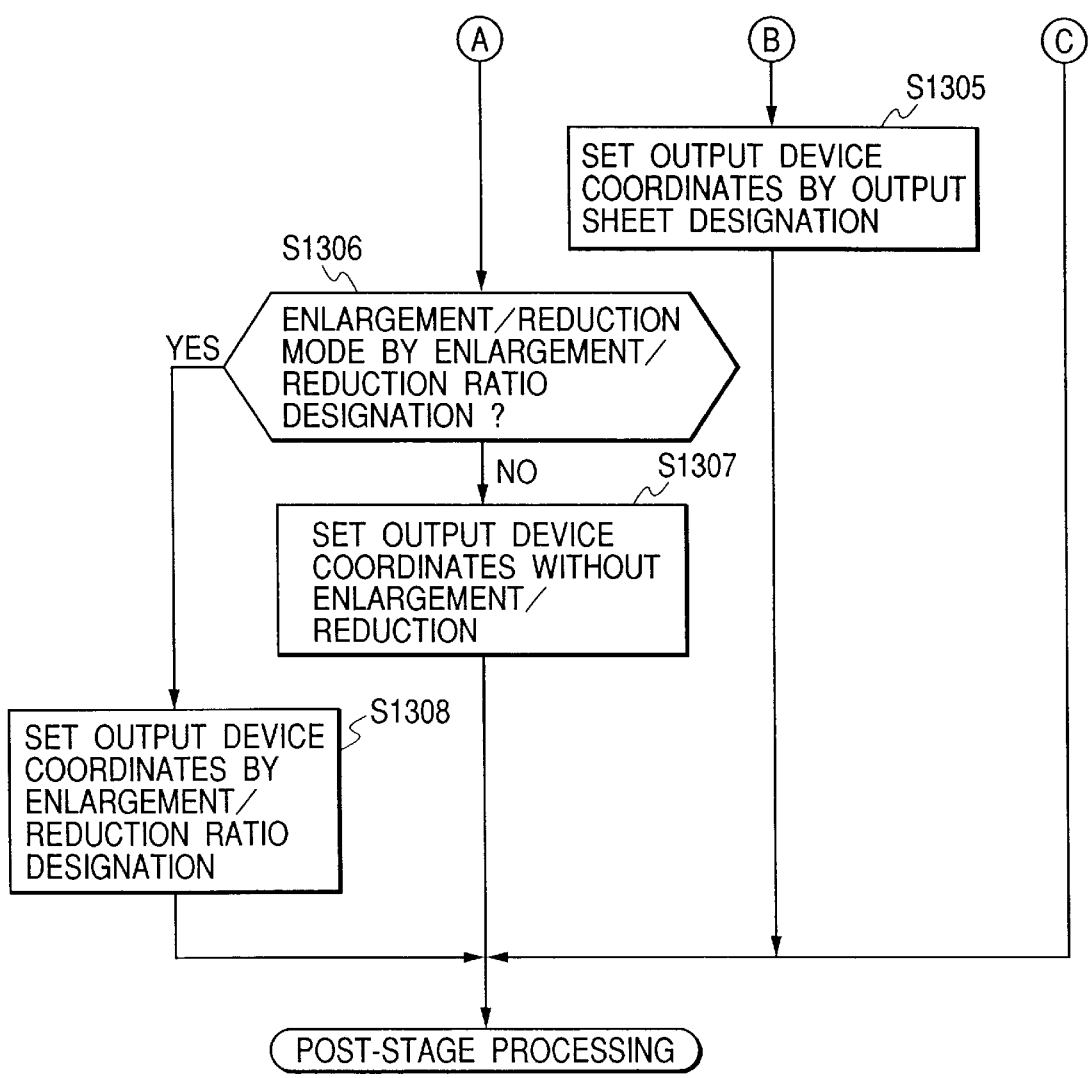

FIG. 13 is a flow chart showing the process flow for the enlarged/reduced printing. At first the despooler 305 reads the effective print area of the input sheet, the size of the output sheet, the effective print area of the output sheet, the offset value and the set enlargement/reduction mode (step S1301). This process is achieved by reading the data required for enlarged/reduced printing, from the spool file 303 generated by the spooler 302. Then the flow branches in the following manner according to the enlargement/reduction mode. The enlarged/reduced printing has three modes, namely the enlarged/reduced printing designated by the output sheet, that designated by the enlargement/reduction ratio, and that designated by the output sheet and by the enlargement/reduction ratio.

At first, based on the read enlargement/reduction mode, there is discriminated whether the enlarged/reduced printing designated by the output sheet and the enlarged/reduced printing designated by the enlargement/reduction ratio are set (step S1302). If the setting of both modes is identified, there is set the coordinate of the output device under the designation of the output sheet and that of the enlargement/reduction ratio (step S1303). The details of this process will be explained later with reference to FIGS. 18 and 19.

If both the enlargement/reduction designated by the output sheet and that designated by the enlargement/reduction ratio are not set, there is then discriminated whether the enlargement/reduction mode designated by the output sheet is set (step S1304). If the setting of the enlargement/reduction mode designated by the output sheet is identified, there is set the coordinate of the output device under the designation of the output sheet (step S1305). The details of this process will be explained later with reference to FIGS. 15 and 16.

If the setting of the coordinate of the output device under the designation by the output sheet is not executed, there is then discriminated whether the enlargement/reduction mode designated by the enlargement/reduction ratio is set (step S1306). If the setting of the enlargement/reduction mode designated by the enlargement/reduction ratio is identified, there is set the coordinate of the output device under the designation of the enlargement/reduction ratio (step S1308). The detail of this process will be explained later with reference to FIG. 17.

If the setting of the enlargement/reduction mode designated by the enlargement/reduction ratio is not executed, there is set the coordinate of the output device for the ordinary printing (printing without enlargement or reduction) (step S1307). This is the setting of the coordinate of the output device in case enlarged/reduced printing is not executed, and the input sheet and the output sheet become equal unless another setting for altering the output format other than the enlarged/reduced printing is made.

Figure 15:
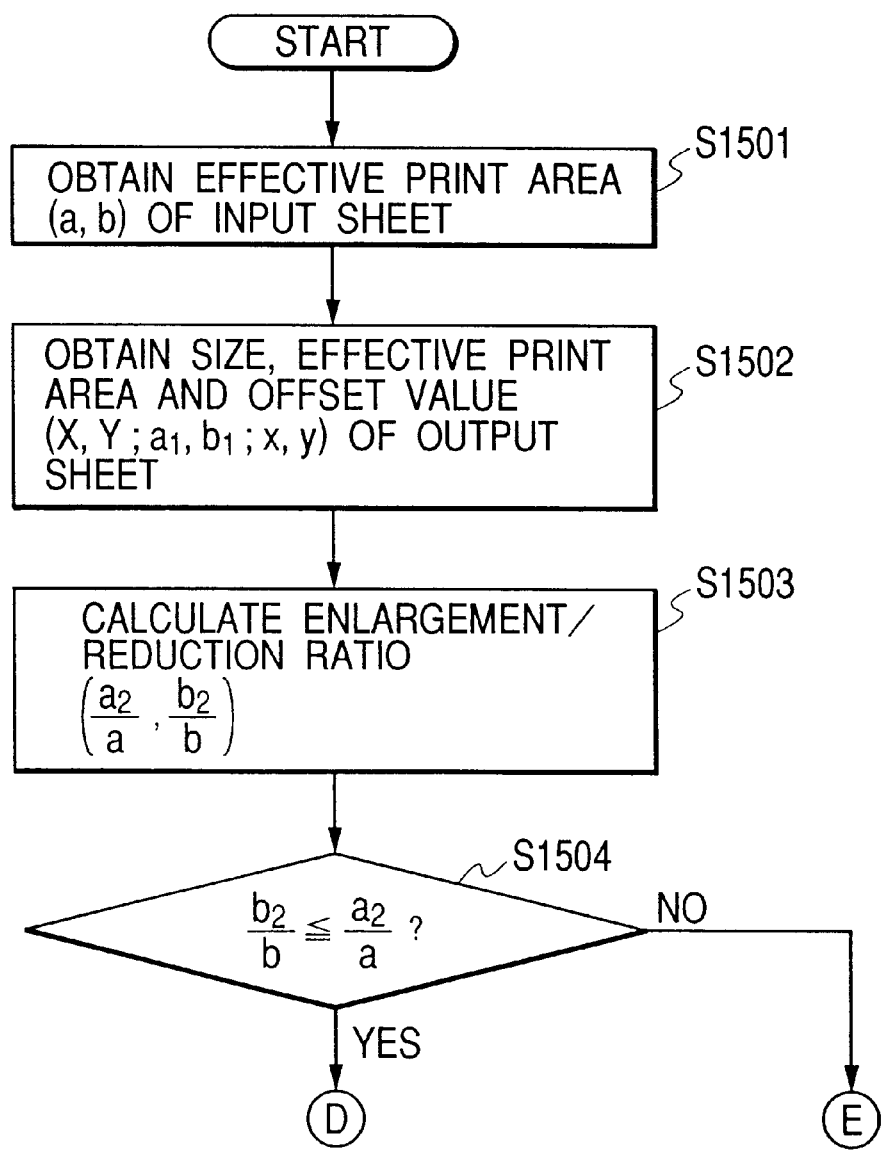
FIGS. 15, 16 and 17 are flow charts showing a process for setting the output device coordinate according to the designation of the output sheet, in the fifth embodiment of the present invention.
Figure 21A:
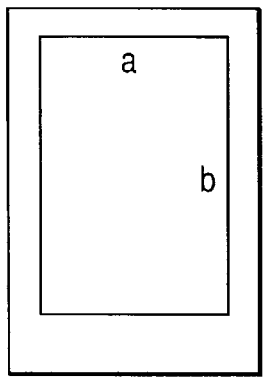
Figure 21B:
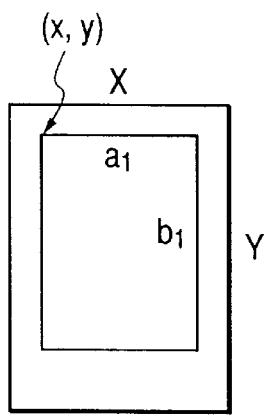

In the following there will be explained, with reference to FIGS. 15, 16 and 21A to 21E, the setting process (step S1305 in FIG. 14) for the coordinate of the output device under the designation by the output sheet. FIGS. 21A and 21B respectively indicates an input sheet and an output sheet, wherein a, b, a1 and b1 indicate the effective print area, X and Y indicate the sheet size, and x and y indicate offset values from the original point. In the following there will be explained, as an example, the reduced printing from a sheet A to a sheet B. Referring to FIG. 15, at first there is executed a process of acquiring the height and width of the effective print area of the input sheet (step S1501) to obtain the size of the effective print area constituting the source information. This acquires values a and b. Then there is executed a process (step S1502) of acquiring the height and width of the output sheet (indicating size, effective print area and offset values), thereby obtaining the size, effective print area and offset value (X, Y, a1, b1, x, y) providing the target of reduction (cf. FIG. 21B).

After the acquisition of these data, there are calculated the enlargement/reduction ratios in the horizontal and vertical directions (step S1503). At first, based on the output sheet size (X, Y), the effective print area (a1, b1) of the output sheet and the offset values (x, y), the effective print area is adjusted (cf. FIG. 21C), in order to match the portions outside the effective print area in the vertical and horizontal directions, in such a manner as to adopt the larger one in the vertical and horizontal directions, thereby obtaining a new effective print area (a2, b2). The enlargement/reduction ratios are calculated from such area and the effective print area (a, b) of the input sheet. Thus the enlargement/reduction ratio becomes a2/a in the horizontal direction and b2/b in the vertical direction.

Then there is discriminated whether the enlargement/reduction ratio in the horizontal direction is larger than that in the vertical direction (step S1504), in order to judge which enlargement/reduction ratio is to be adopted for achieving the enlarged/reduced printing without changing the height/width ratio. As the reduction is executed with the smaller one of the enlargement/reduction ratios in the vertical and horizontal directions, there is executed a process (step S1505) of calculating the print area in the vertical and horizontal directions with the enlargement/reduction ratio in the vertical direction if it is identified smaller, or a process (step S1506) of calculating the print area in the vertical and horizontal directions with the enlargement/reduction ratio in the horizontal direction if it is identified smaller.

In this example it is assumed that the ratio a2/a is smaller. Thus the step S1506 executes calculations with the enlargement/reduction ratio in the horizontal direction to obtain the print area a2 in the horizontal direction and the print area b×a2/a in the vertical direction (cf. FIG. 21E). These calculated print areas are used in a next step of setting the output device coordinate (step S1507), which defines the method of converting a coordinate point from the logic coordinate to the device coordinate and sets the x-range and y-range of the output device. In the present example, there are set values a2 and b×a2/a, by which the print data to be processed thereafter are reduced in printing.

Figure 17:
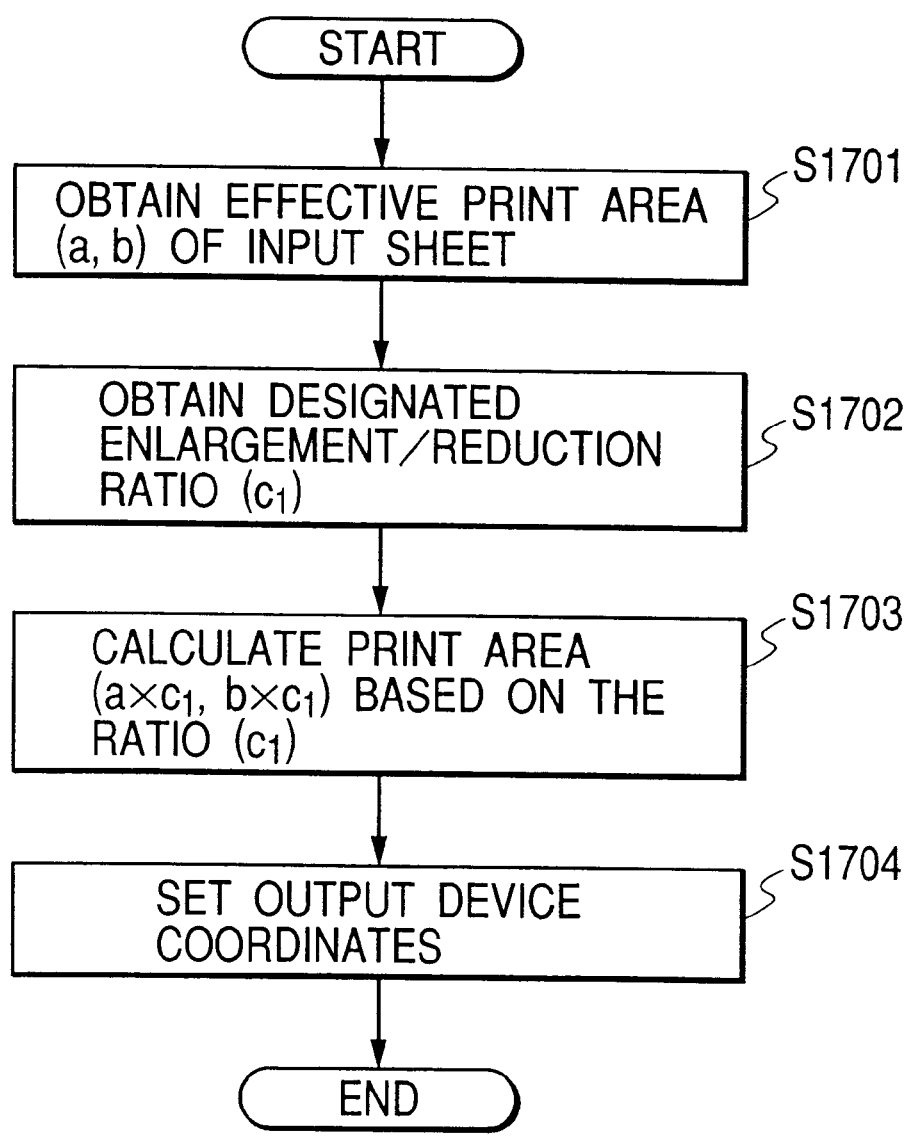

In the following there will be explained, with reference to FIG. 17, the setting process (step S1308 in FIG. 14) for the coordinate of the output device under the designation by the enlargement/reduction ratio.

At first there is executed a process of acquiring the height and width of the effective print area of the input sheet (step S1701) to obtain the size of the effective print area constituting the source information. This acquires values a and b. Then there is executed a process (step S1702) of acquiring the enlargement/reduction ratio. This value, like other values, is stored by the spooler 302 and is read by the despooler 305, and is a user set value. This is represented by c1.

Then there are calculated the print areas in the vertical and horizontal directions based on the enlargement/reduction ratio (step S1703). The print areas are determined from the acquired value c1 as a×c1 in the horizontal direction and as b×c1 in the vertical direction. Then, as explained in the foregoing, there is executed a setting step for the output device coordinate (step S1704) to set a×c1 and b×c1 respectively as the x-range and y-range of the output device. Therefore, the print data to be processed thereafter are reduced in printing.

In the following there will be explained, with reference to FIGS. 18 and 19, the setting process (step S1303 in FIG. 14) for the coordinate of the output device under the designation by the output sheet and by the enlargement/reduction ratio.

Figure 16:
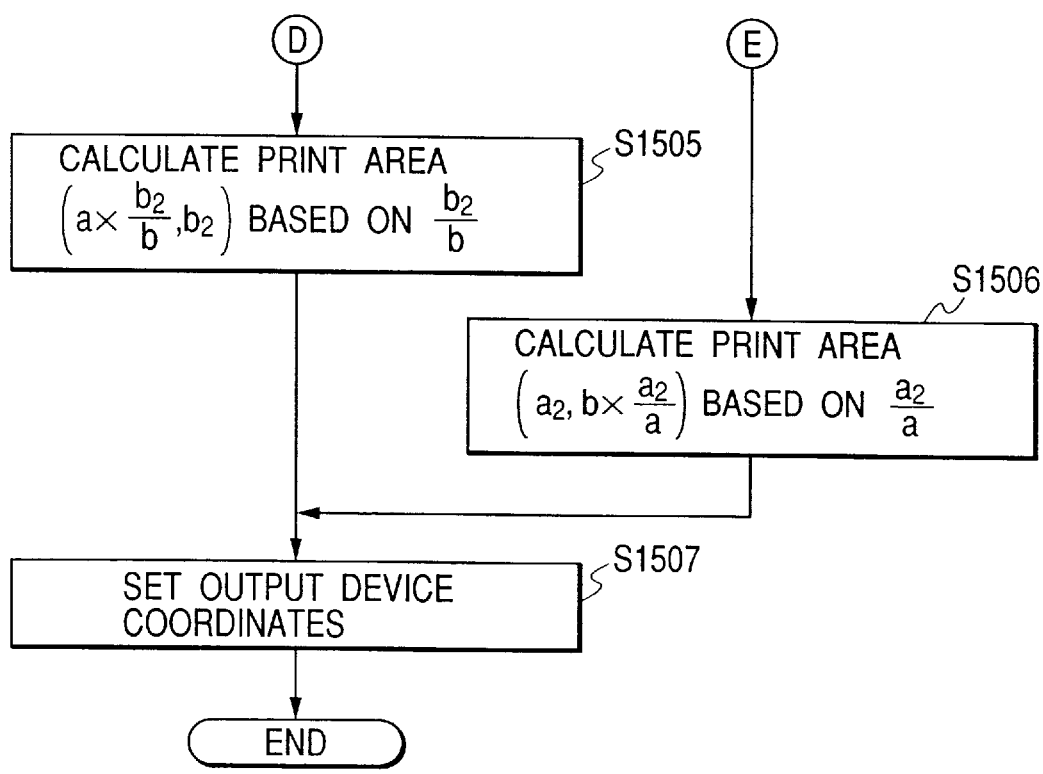
Figure 18:
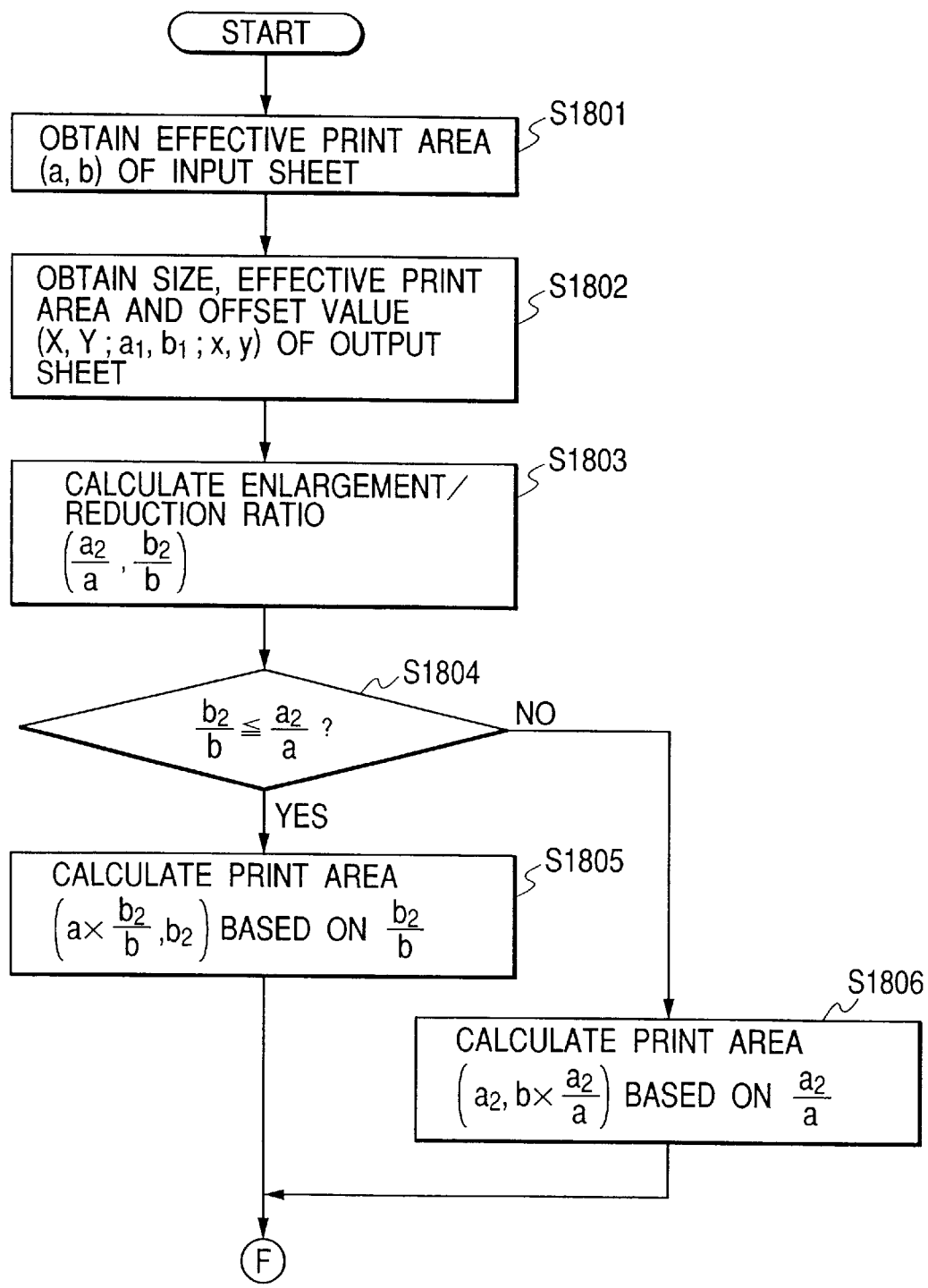
FIGS. 18 and 19 are flow charts showing a process for setting the output device coordinate according to the designation of the output sheet and the enlargement/reduction rate, in the fifth embodiment of the present invention.
Figure 19:
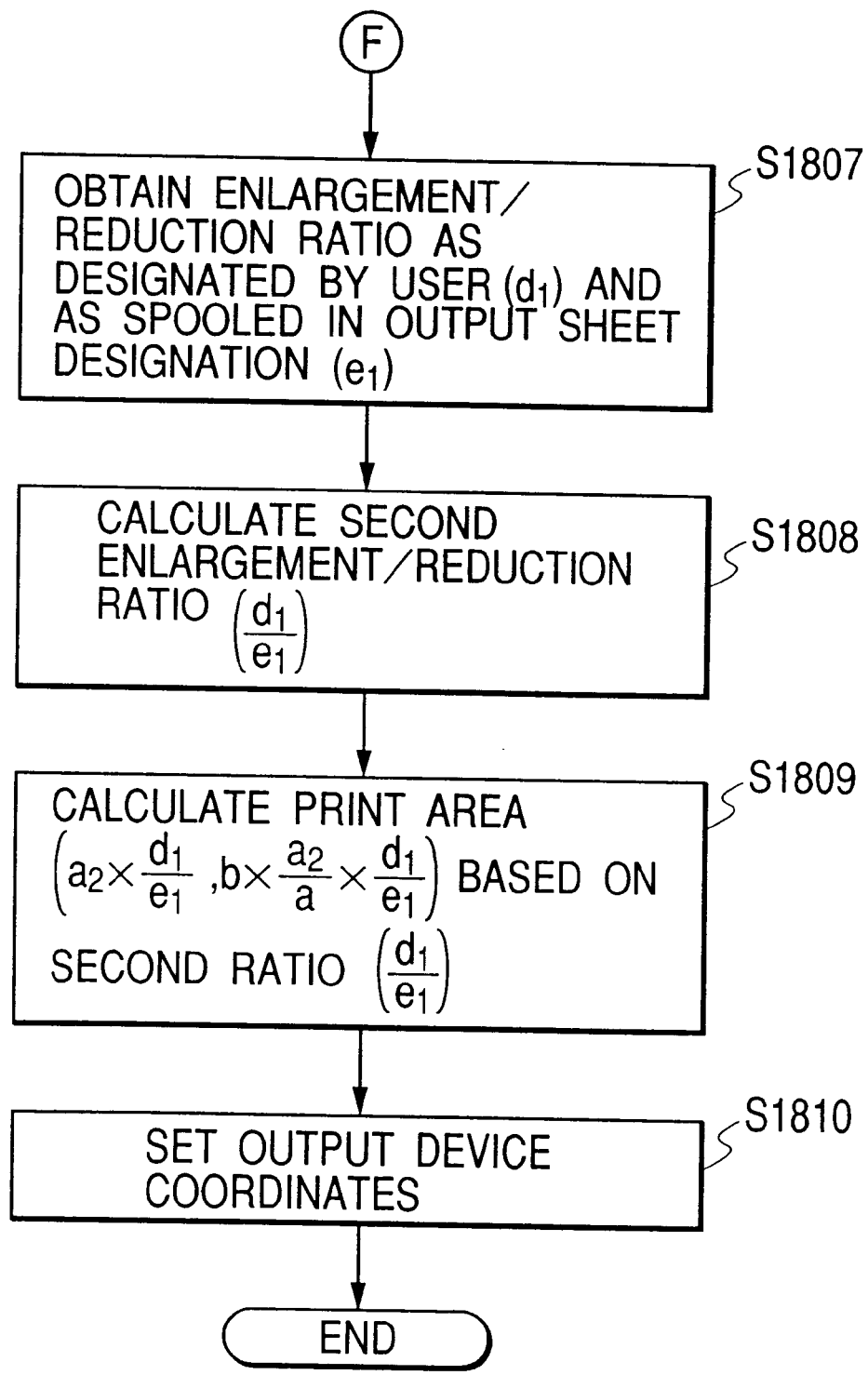

Steps S1801 to S1806 in FIG. 18 are similar to those S1501–S1506 in FIGS. 15 and 16 and calculate the enlarged/reduced print area designated by the output sheet. Then there is executed a process of acquiring the enlargement/reduction ratio (step S1807). This step acquires the enlargement/reduction ratio set by the user and that designated by the output sheet (acquired from the driver and spooled), respectively represented as d1 and e1. Then there is executed a process (step S1808) of calculating a second enlargement/reduction ratio. As the enlarged/reduced print area designated by the output sheet is already calculated, this step obtains a value d1/e1.

Figure 21C:
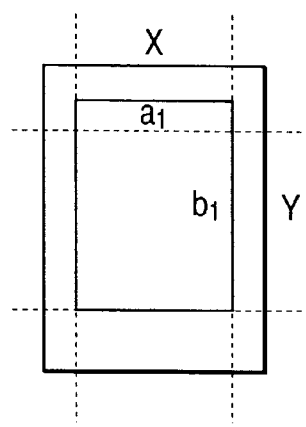
Figure 21D:
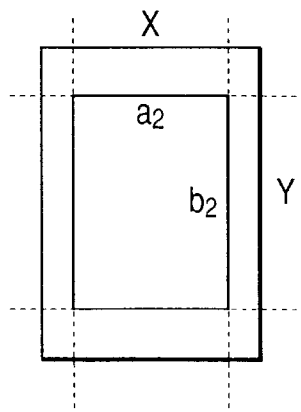
Figure 21E:
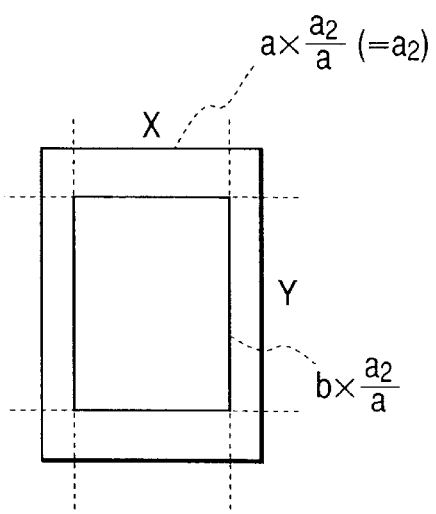

Then there is executed a calculating step (step S1809) for obtaining the print area with the second enlargement/reduction ratio. With the already calculated enlarged/reduced print area designated by the output sheet as shown in FIG. 21C, this step obtains a value a2×d1/e1 in the horizontal direction and a value b×a2/a×d1/e1 in the vertical direction. Then a setting step (step S1810) for the output device coordinate sets a2×d1/e1 and b×a2/a×d1/e1 respectively as the x-range and y-range of the output device. In this manner the print data to be processed thereafter are enlarged or reduced in printing.

As explained in the foregoing, the printer control system of the fifth embodiment is provided with the spooler 302 for storing the effective print area of the input sheet, the size and effective print area of the output sheet, the offset values and the set enlargement/reduction mode, and the despooler 305 for judging whether the enlargement/reduction is designated by the output sheet, by the enlargement/reduction ratio or by the output sheet and the enlargement/reduction ratio, setting the coordinate of the output device based on the result of judgment and executing the printing of the print data based on such setting, whereby an enlarging/reducing function can be provided to a device (printing device such as a printer) lacking such enlarging/reducing function and the enlarged/reduced printing can be realized without changing the content of the original print data.

[6] Sixth Embodiment

The printer control system of the sixth embodiment is composed, as in the first embodiment, of a host computer 3000 provided with a CPU 1, a RAM 2, a ROM 3, a keyboard controller (KBC) 5, a CRT controller (CRTC) 6, a disk controller (DKC) 7, a printer controller (PRTC) 8, a keyboard (KB) 9, a CRT display (CRT) 10, and an external memory 11, and a printer 1500 provided with a CPU 12, a RAM 19, a ROM 13, an input unit 18, a printer interface (I/F) 16, a memory controller (MC) 20, a printer engine 17, an operation unit 1501, and an external memory 14 (cf. FIG. 1).

Also in the sixth embodiment, the control by the host computer 3000 for generating the print data (cf. FIG. 2), the control with the expanded configuration for generating the print data (cf. FIG. 3) and the configuration of the memory map in a state where the printing related modules including the printing mode control program are loaded in the RAM 2 of the host computer 3000 and are rendered operable, are similar to those in the first embodiment and will not, therefore, be explained further. Also in the sixth embodiment, there can be executed processes same as those in the foregoing embodiments.

The printer control system of the sixth embodiment is to execute centering to an appropriate position on the output sheet, in case the enlarged/reduced printing designated by the output sheet or the enlarged/reduced printing designated by the output sheet and by the enlargement/reduction ratio is selected. The printer control system of the sixth embodiment is also capable of printing plural logic pages (page processed by the application) in a single physical page (actually outputted page).

Figure 20:
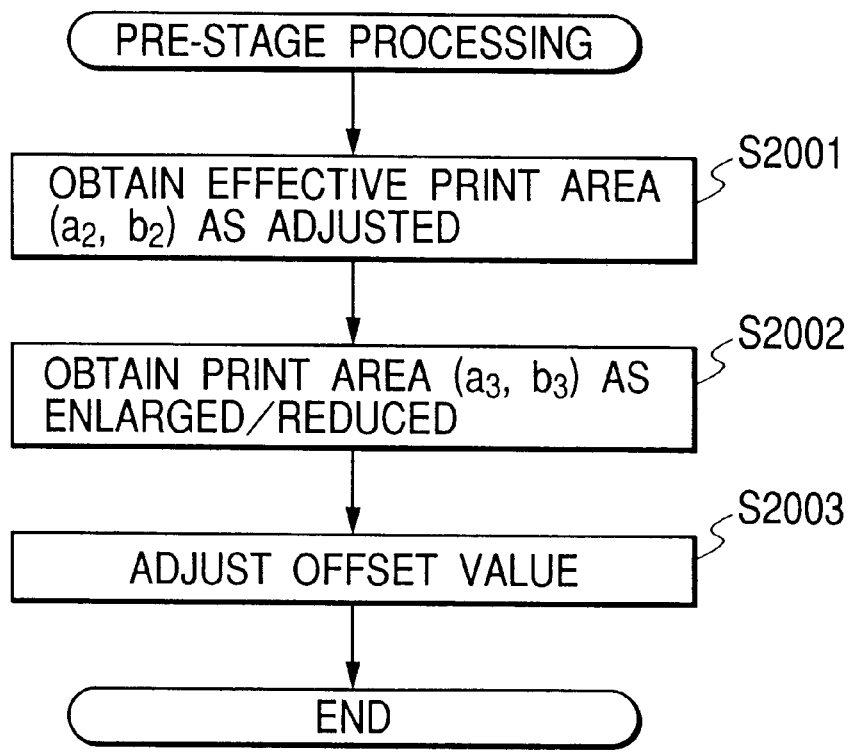
FIG. 20 is a flow chart showing a centering process under the designation of an enlarged/reduced printing in a sixth embodiment of the present invention.
Figure 22A:
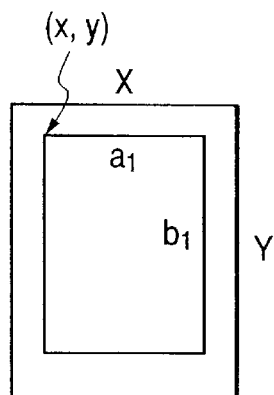
FIGS. 22A, 22B, 22C and 22D are views showing the centering operation in the sixth embodiment of the present invention, respectively showing the relationship between the output sheet and the effective print area.
Figure 22B:
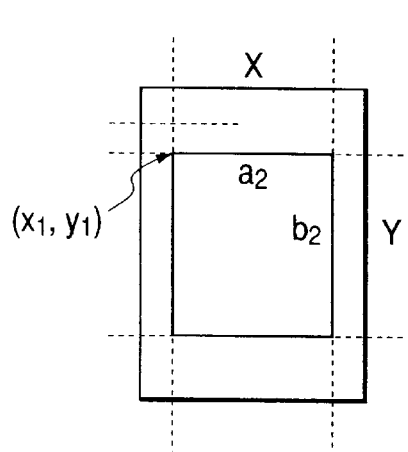
Figure 22C:
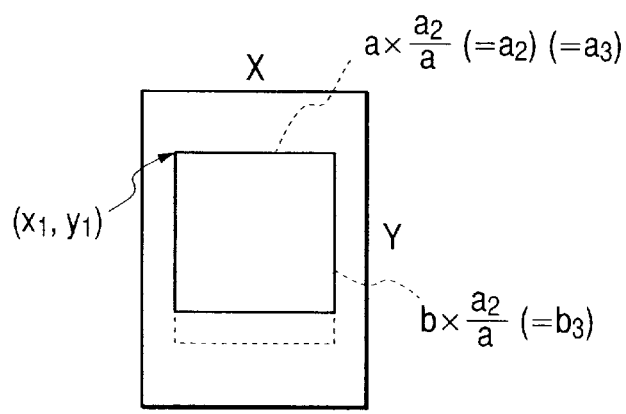

In the following there will be explained in detail, with reference to FIGS. 20 and 22A to 22D, the centering process in the printer control system of the sixth embodiment. FIG. 20 is a flow chart outlining the centering process, and FIGS. 22A to 22D show examples thereof, wherein FIG. 22A shows an output sheet as in FIG. 21B in the foregoing first embodiment.

At first there is acquired an adjusted effective print area (step S2001). Through a process as in the fifth embodiment, there are determined a2, b2 in such a manner that the effective print area is positioned at the center in the vertical and horizontal directions in the sheet size (cf. FIG. 22B). The offset values after this adjustment are defined as x1, x2. Then there is acquired the print area after the enlargement/reduction (step S2002), whereby acquired is the print area determined with the smaller one of the enlargement/reduction ratios in the vertical and horizontal directions. The acquired area is defined by a3, b3 (cf. FIG. 22C).

Figure 22D:
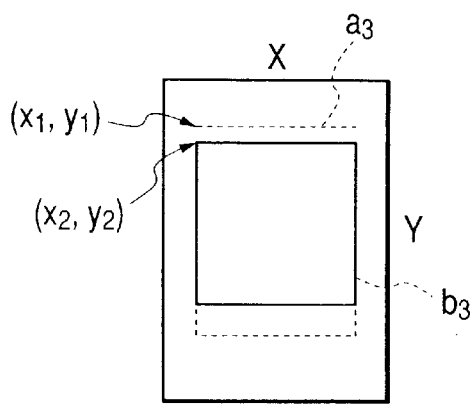
Figure 23A:
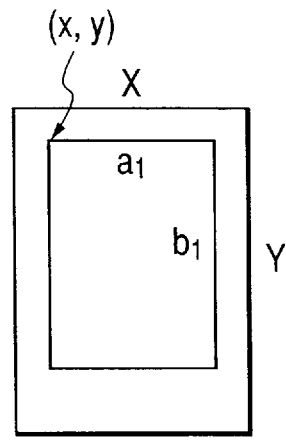
FIGS. 23A, 23B, 23C and 23D are views showing the book-bound printing in the sixth embodiment of the present invention, respectively showing the relationship between the output sheet and the effective print area.
Figure 23B:
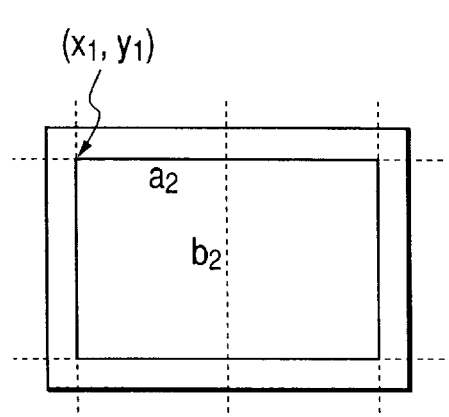
Figure 23C:
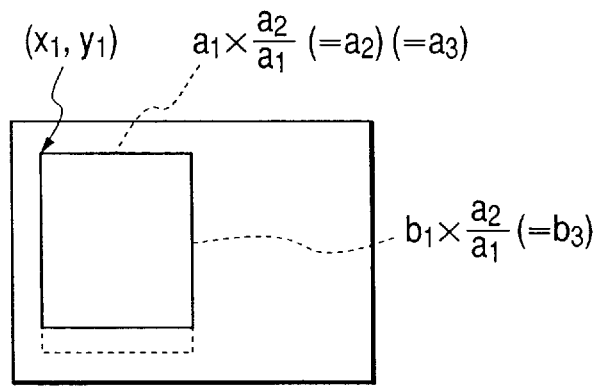
Figure 23D:
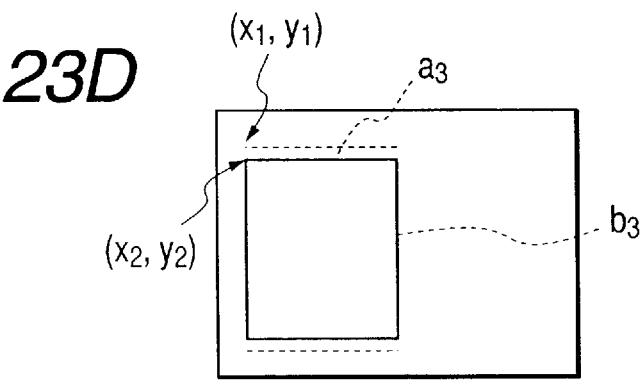

Then executed is the adjustment of the offset values (step S2003), in such a manner that the actual print area comes to the center in the vertical and horizontal directions. The coordinates x2, y2 of the upper left corner after the adjustment, taking the upper left corner of the sheet as the original point, are represented by:

$x2=x1+(a2-a3)/2$ $y2=y1+(b2-b3)/2$ whereby the offset values are so adjusted that the print area is centered in an appropriate position in the sheet size (cf. FIG. 22D).

In the following, as an example of printing plural logic pages in a physical page in the printer control system of the sixth embodiment, there will be explained a book-bound printing with reference to FIGS. 20 and 23A to 23D. The book-bound printing is a method of printing two sides of a sheet in such a manner that a bound book is formed when the sheets are stapled at the center. In this example, the input sheet and the output sheet are assumed to be same.

At first there is acquired the adjusted effective print area (step S2001). Through a process similar to that in the fifth embodiment, values a2, b2 are determined in such a manner that the effective print area is positioned at the center in the vertical horizontal direction in the sheet size (cf. FIG. 23B). However the orientation of printing is changed, and, for printing two logic pages in a physical page, there are acquired values a2=b1/2 and b2=a1. Then executed is the acquisition of the print area after enlargement/reduction (step S1002), whereby acquired is the print area determined with the smaller one of the enlargement/reduction ratios already calculated in the vertical and horizontal directions. The acquired area is defined by b3=b1×a2/a1 (vertical direction after the change of sheet orientation) and a3=a1×a2/a1 (horizontal direction after the change of sheet orientation) (cf. FIG. 23C).

Then the offset values are adjusted (step S2003) in such a manner that the actual print area comes to the center of the sheet size in the horizontal and vertical directions. The coordinates x2, y2 of the upper left corner after this adjustment, taking the upper left corner of the sheet as the original point, are represented by $x2=x1+(a2-a3)/2$ and $y2=y1+(b2-b3)/2$ as in the centering at the enlargement/reduction, whereby the offset values are so adjusted that the print area is provided in an appropriate position in the sheet size (cf. FIG. 23D).

As explained in the foregoing, the printer control system of the sixth embodiment is provided with the spooler 302 for storing the effective print area of the input sheet, the size and effective print area of the output sheet, the offset values and the set enlargement/reduction mode, and the despooler 305 for judging whether the enlargement/reduction is designated by the output sheet, by the enlargement/reduction ratio or by the output sheet and the enlargement/reduction ratio, setting the coordinate of the output device based on the result of judgment, executing the printing of the print data based on such setting, effecting the centering in an appropriate print position based on the effective print area of the input sheet, the size and effective print area of the output sheet, the offset values and the set enlargement/reduction mode, and, in case printing plural logic pages in a physical page, positioning the plural logic pages in a print position symmetrical in the vertical and horizontal directions, whereby a proper output format can be obtained by the centering of the print data in the appropriate position in the enlarging/reducing function, and, particularly in the two-side printing, prints can be obtained in a same position on both sides of the sheet.

Also in a printing device capable of printing plural logic pages on a physical page, the print data can be printed in a position exactly symmetrical in the horizontal and vertical directions, and, particularly in case of book-bound printing, a book can be bound without modifying the result of output.

Also as in the foregoing fifth embodiment, an enlarging/reducing function can be provided to a device lacking such enlarging/reducing function and the enlarged/reduced printing can be realized without changing the content of the original print data.

The present invention explained in the foregoing first to sixth embodiments may be applied to a system consisting of plural equipment (for example host computer, interface devices, reader, printer etc.) or an apparatus consisting of a single equipment (such as a copying machine or a facsimile apparatus). Also the objects of the present invention can naturally be attained in a case where a memory medium storing the program codes of a software realizing the functions of the aforementioned embodiments is supplied to a system or an apparatus and a computer (CPU or MPU) of the above-mentioned system or apparatus reads and executes the program codes stored in the memory medium.

In such case the program codes themselves of the software realize the functions of the aforementioned embodiments, and the memory medium storing the program codes constitutes the present invention.

The memory medium storing such program codes can be, for example, a floppy disk, a hard disk, an optical disk, a magnetooptical disk, a CD-ROM, a CR-R, a magnetic tape, a non-volatile memory card or a ROM.

The present invention also includes not only a case where the functions of the aforementioned embodiments are realized by the execution of the program codes read by the computer but also a case where an operating system or the like functioning on the computer executes all or a part of the actual processes under the control of such program codes thereby realizing the functions of the foregoing embodiments.

The present invention further includes a case wherein the program codes read from the memory medium are once stored in a function expansion board inserted into the computer or a function expansion unit connected to the computer, and a CPU provided in the function expansion board or the function expansion unit executes all the process or a part thereof according to the instructions of such program codes, thereby realizing the functions of the aforementioned embodiments.

As explained in the foregoing the present invention provides a print control apparatus for executing layout of the print sheet, comprising sheet determination means for determining the sheet size and the orientation thereof based on the page size information of the print data, area determination means for determining a print area by dividing the sheet into N (being a natural number), enlargement/reduction means for executing enlargement/reduction with an enlargement/reduction ratio independent for each page data based on the size of each print area and the size of each page data, and arrangement means for arranging each enlarged/reduced page data in each print area, whereby, even in case plural sheet sizes or plural sheet orientations are mixed within a document, an output result similar to that of a document not including such mixed sizes or orientations can be obtained without sheet discharge in the course of printing or without the data overflow from the print area.

Also according to the present invention, there is provided a print control apparatus comprising storage means for storing the page size information of the page data, wherein the enlargement/reduction means is adapted to calculate the enlargement/reduction ratio based on the stored page size information, whereby it is rendered possible to enlarge or reduce the page data with an appropriate enlargement/reduction ratio based on the page size information and to arrange the page data in each print area, and, even in case plural sheet sizes or plural sheet orientations are mixed within a document, an output result similar to that of a document not including such mixed sizes or orientations can be obtained without sheet discharge in the course of printing or without the data overflow from the print area.

Also according to the present invention, as the sheet determination means of the print control apparatus is adapted to determine the optimum sheet size based on the page size information of N pages to be printed on a same sheet, whereby the page data can be arranged in each print area of the sheet of optimum size, and, even in case plural sheet sizes or plural sheet orientations are mixed within a document, an output result similar to that of a document not including such mixed sizes or orientations can be obtained without sheet discharge in the course of printing or without the data overflow from the print area.

Also according to the present invention, as the sheet determination means of the print control apparatus is adapted to determine the sheet size based on an externally entered instruction, there can be obtained, even in case plural sheet sizes or plural sheet orientations are mixed within a document, an output result similar to that of a document not including such mixed sizes or orientations in a size desired by the user, without sheet discharge in the course of printing or without the data overflow from the print data.

Also according to the present invention, as the sheet determination means of the print control apparatus is adapted, in case of two-side printing, to determine the optimum sheet size based on the page information of 2N pages to be printed on a same sheet, and, there can be obtained, even in case plural sheet sizes or plural sheet orientations are mixed within a document in two-side printing, an output result similar to that of a document not including such mixed sizes or orientations, without sheet discharge in the course of printing or without the data overflow from the print area.

Also according to the present invention, as the enlargement/reduction means of the print control apparatus is adapted to employ a enlargement/reduction ratio providing the largest image not overflowing from each print area without changing the page size information and the height/width ratio of the original print data, whereby there can be obtained an output result agreeable for observation and adequately accommodated in the print area.

Also according to the present invention, the area determination means of the print control apparatus is adapted, in case the sheet division number N is a multiple of 2 and is not the square of a natural number, not to change the sheet orientation at the sheet division for a sheet of which the longer side exceeds twice of the shorter side, but, to change the sheet orientation for a sheet of which the longer side is less twice of the shorter side, whereby there can be obtained a larger divided area and the printing can be realized with a larger size even on an oblong sheet of which the longer side exceeds twice of the shorter side thereof.

Also according to the present invention, as the print control apparatus is applicable to a system in which the printing is executed by transmitting print data from an upper device such as a computer to a printing device such as a printer, there can be obtained, in case of printing in a system in which the upper device transmits print data to the printing device, even if plural sheet sizes or plural sheet orientations are mixed within a document, an output result similar to that of a document not including such mixed sizes or orientations, without sheet discharge in the course of printing or without the data overflow from the print area.

Also according to the present invention, as the print control apparatus includes storage means for temporarily storing the data in an intermediate data format different from the format of the print data, and preparation means for preparing the print data based on the temporarily stored data, there can be obtained, in case of printing in a system in which the upper device temporarily stores the data in the intermediate code format, then prepares the print data and transmits the print data to the printing device, even if plural sheet sizes or plural sheet orientations are mixed within a document, an output result similar to that of a document not including such mixed sizes or orientations, without sheet discharge in the course of printing or without the data overflow from the print area.

Also according to the present invention, there is provided a print control apparatus for effecting layout of the print sheet, comprising dispatcher means for receiving, from drawing means dependent on the operating system, common print information generated based on drawn data generated by an arbitrary application, intermediate data conversion means for converting the print information, received by the dispatcher means, into intermediate data and storing the intermediate data in spooling means, setting means for setting a designation for assigning N logic pages (N being a natural number) to a physical page, area determination means for dividing the physical page into N thereby determining a print area corresponding to a logic page and determining the enlargement/reduction ratio for each logic page, process means for processing the intermediate data stored in the spooling means in such a manner that the logic page corresponding to thus determined print area is arranged therein with an enlargement or a reduction, and outputting the processed data in the drawn data format to the drawing means, and print data generation means for converting the print information received by the dispatcher means into print data consisting of control commands and outputting the print data to an external device, whereby the enlarging/reducing function can be provided to a device (printing device such as a printer) lacking such function. Also there is obtained an effect that the original print data can be directly enlarged or reduced in printing without change in the content.

Also according to the present invention, the drawing data, being GDI (graphical device interface), can be applied to a system employing an application outputting the GDI function.

Also according to the present invention, the print information, being DDI (device driver interface), can be applied to a system employing a graphic engine outputting the DDI function.

Also according to the present invention, the print data being a page description language, can be applied to a system employing a printer driver capable of generating the print data with the page description language.

Also according to the present invention, there is provided a print control apparatus for controlling the printing operation, comprising memory means for storing the effective print area of the input sheet, the size and effective print area of the output sheet, the offset values and the set enlargement/reduction mode, discrimination means for discriminating the set enlargement/reduction mode, setting means for setting the coordinate of the output device based on the result of discrimination, and print control means for effecting the printing operation with the stored print data based on the setting, whereby an enlarging/reducing function can be provided to a device (printing device such as a printer) lacking such function. Also there can be obtained an effect that the original print data can be directly printed with enlargement or reduction, without change in the content.

Also according to the present invention, as the print control apparatus is applicable a system in which an upper device such as a computer temporarily stores data in an intermediate data format different from that of the print data and transmits the print data, prepared from the temporarily stored data, to a printing device such as a printer, the enlarging/reducing function can be provided to the printing device of the system even in case the printing device lacks such function. Also there can be obtained an effect that the original print data can be directly printed with enlargement or reduction, without change in the content.

Also according to the present invention, as the memory means of the print control apparatus temporarily stores the effective print area of the input sheet, the size and effective print area of the output sheet, the offset values and the set enlargement/reduction mode in the form of intermediate codes, there can be provided an effect, in case of temporarily storing the data of an intermediate code format different from that of the print data and effecting the printing operation by transmitting the print data prepared from the stored data to the printing device, of providing the enlarging/reducing function to the printing device lacking such function. Also there can be obtained an effect that the original print data can be directly printed with enlargement or reduction, without change in the content.

Also according to the present invention, as the enlargement/reduction mode of the print control apparatus includes the enlargement/reduction mode designated by the output sheet, that designated by the enlargement/reduction ratio and that designated by the output sheet and by the enlargement/reduction ratio, there can be obtained an effect that the original print data can be directly printed with enlargement or reduction, without change in the content, by selecting a desired mode from these three enlargement/reduction modes.

Also according to the present invention, as the print control apparatus comprises arrangement means for effecting centering to the appropriate print position based on the effective print area of the input sheet, the size and effective print area of the output sheet, the offset values and the set enlargement/reduction mode, whereby the print data can be centered to an appropriate position in the enlarging/reducing function to obtain a proper output format, and, particularly in a printing device capable of two-side printing, the printing can be made in a same position on both sides of the sheet.

Also according to the present invention, the print control means of the print control apparatus has a function of printing plural logic pages on a physical page, and the arrangement means places, in the printing operation, the plural logic pages in a print position symmetrical in the vertical and horizontal directions, whereby, in the printing device capable of printing plural logic pages on a physical page, the print data can be printed in an exactly symmetrical position in the vertical and horizontal directions, and, particularly in the book-bound printing, the sheets can be stapled without any particular processing on the output result.

Also according to the present invention, the logic page of the print control apparatus is a page processed in the application while the physical page is an actually printed page, so that, in the printing apparatus capable of printing plural logic pages on a physical page, the print data can be printed in an exactly symmetrical position in the vertical and horizontal directions, and, particularly in the book-bound printing, the sheets can be stapled without any particular processing on the output result.

Also according to the present invention, there is provided a print control apparatus for effecting layout of the print sheet, comprising dispatcher means for receiving, from drawing means dependent on the operating system, common print information generated based on drawn data generated by an arbitrary application, intermediate data conversion means for converting the print information, received by the dispatcher means, into intermediate data and storing the intermediate data in spooling means, setting means for setting the enlargement/reduction mode, process means for processing the intermediate data stored in the spooling means in such a manner that the logic page is enlarged or reduced and arranged in the physical page with the enlargement/reduction ratio of thus set enlargement/reduction mode, and outputting the processed data in the drawing data format to the drawing means, and print data generation means for converting the print information received by the dispatcher means into print data consisting of control commands and outputting the print data to an external device, whereby the enlarging/reducing function can be provided to a device (printing device such as a printer) lacking such function. Also there is obtained an effect that the original print data can be directly enlarged or reduced in printing without change in the content.

Also according to the present invention, the drawing data, being GDI (graphical device interface), can be applied to a system employing an application outputting the GDI function.

Also according to the present invention, the print information being DDI (device driver interface), can be applied to a system employing a graphic engine outputting the DDI function.

Also according to the present invention, the print data, being a page description language, can be applied to a system employing a printer driver capable of generating the print data with the page description language.

What is claimed is:

1. An information processing apparatus as a host computer for generating print data by executing layout of a print sheet, comprising:

reception means for receiving common print information from a graphic engine which generates the common print information from drawing data generated by an arbitrary application, a sheet size or a sheet orientation included in the print information being arbitrarily determined by a logic page unit;

area determination means for dividing a physical page by N (N being a natural number) thereby determining a print area corresponding to a logic page;

enlargement/reduction means for determining the enlargement/reduction ratio for each logic page based on the size of each print area and page information, including page size information and page orientation information, of each logic page, and effecting an enlargement/reduction with the enlargement/reduction ratio corresponding to said logic page; and print data generating means for arranging the print information of each enlarged or reduced logic page in said each print area, and generating the print data to be sent to a printing apparatus, wherein if a plurality of logic pages to be arranged on one physical page have different sheet sizes or sheet orientations, said enlargement/reduction means determines different enlargement/reduction ratios for the plurality of logic pages.

2. An apparatus according to claim 1, further comprising:

storage means for storing the page information of said logic page; and sheet determination means for determining the size and orientation of the physical page, based on page size information contained in the page information of said logic page;

wherein said enlargement/reduction means is adapted to calculate the enlargement/reduction ratio based on said stored page information and said determined sheet size.

3. An apparatus according to claim 2, wherein said sheet determination means is adapted to determine an optimum sheet size based on the page information of N pages to be printed on a same sheet.

4. An apparatus according to claim 2, wherein said sheet determination means is adapted to determine the sheet size based on an externally entered instruction.

5. An apparatus according to claim 2, wherein said sheet determination means is adapted, in case of two-side printing, to determine an optimum sheet size based on the page information of 2N pages to be printed on a same sheet.

6. An apparatus according to claim 1, wherein said enlargement/reduction means is adapted to employ a largest enlargement/reduction ratio not causing overflow from each print area, without changes in the page size and the height/width ratio of the original logic page.

7. A print control apparatus for executing layout of a print sheet, comprising:

area determination means for dividing a physical page by N (N being a natural number) thereby determining a print area corresponding to a logic page;

enlargement/reduction means for determining the enlargement/reduction ratio for each logic page based on the size of each print area and page information of each logic page, and effecting an enlargement/reduction with the enlargement/reduction ratio corresponding to said logic page; and arrangement means for arranging each enlarged or reduced logic page in said each print area, wherein said area determination means is adapted, in case the division number N of the sheet is a multiple of 2 and is not the square of a natural number, not to change the sheet orientation for a sheet of which the longer side is equal to or larger than twice of the shorter side, but to change the sheet orientation for a sheet of which the longer side is less than twice of the shorter side.

8. An apparatus according to claim 1, further comprising:

storage means for temporarily storing the data in an intermediate code format different from that of the print data; and preparation means for preparing the print data based on said temporarily stored data.

9. A method carried out in an information processing apparatus as a host computer for generating print data by executing layout of a print sheet, said method comprising:

a reception step of receiving common print information from a graphic engine which generates the common print information from drawing data generated by an arbitrary application, a sheet size or a sheet orientation included in the print information being arbitrarily determined by a logic page unit;

an area determination step of dividing a physical page by N (N being a natural number) thereby determining a print area corresponding to a logic page;

an enlargement/reduction step of determining the enlargement/reduction ratio for each logic page based on the size of each print area and page information, including page size information and page orientation information, of each logic page, and effecting an enlargement/reduction with the enlargement/reduction ratio corresponding to said logic page; and a print data generating step of arranging the print information of each enlarged or reduced logic page in said each print area, and generating the print data to be sent to a printing apparatus, wherein if a plurality of logic pages to be arranged on one physical page have different sheet sizes or sheet orientations, said enlargement/reduction means determines different enlargement/reduction ratios for the plurality of logic pages.

10. A method according to claim 9, further comprising:

a storage step of storing the page information of said logic page; and a sheet determination step of determining the size and orientation of the physical page, based on page size information contained in the page information of said logic page;

wherein said enlargement/reduction step is adapted to calculate the enlargement/reduction ratio based on said stored page information and said determined sheet size.

11. A method according to claim 10, wherein said sheet determination step is adapted to determine an optimum sheet size based on the page information of N pages to be printed on a same sheet.

12. A method according to claim 10, wherein said sheet determination step is adapted to determine the sheet size based on an externally entered instruction.

13. A method according to claim 10, wherein said sheet determination step is adapted, in case of two-side printing, to determine an optimum sheet size based on the page information of 2N pages to be printed on a same sheet.

14. A method according to claim 9, wherein said enlargement/reduction step is adapted to employ a largest enlargement/reduction ratio not causing overflow from each print area, without changes in the page size and the height/width ratio of the original logic page.

15. A method according to claim 9, further comprising:

a storage step of temporarily storing the data in an intermediate code format different from that of the print data; and a preparation step of preparing the print data based on said temporarily stored data.

16. Computer-executable program code stored on a computer readable medium, said computer-executable program code carried out in an information processing apparatus as a host computer for generating print data by executing layout of a print sheet, said computer-executable program code comprising program code executable to perform a method according to any of claims 9 to 14 and 15.

17. A print control method for executing layout of a print sheet, comprising:

an area determination step of dividing a physical page by N (N being a natural number) thereby determining a print area corresponding to a logic page;

an enlargement/reduction step of determining the enlargement/reduction ratio for each logic page based on the size of each print area and page information of each logic page, and effecting an enlargement/reduction with the enlargement/reduction ratio corresponding to said logic page; and an arrangement step of arranging each enlarged or reduced logic page in said each print area, wherein said area determination means is adapted, in case the division number N of the sheet is a multiple of 2 and is not the square of a natural number, not to change the sheet orientation for a sheet of which the longer side is equal to or larger than twice of the shorter side, but to change the sheet orientation for a sheet of which the longer side is less than twice of the shorter side.

18. A memory medium storing a program executed in an information processing apparatus as a host computer for generating print data by executing layout of a print sheet, the program comprising:

a reception step of receiving common print information from a graphic engine which generates the common print information from drawing data generated by an arbitrary application, a sheet size or a sheet orientation included in the print information being arbitrarily determined by a logic page unit;

an area determination step of dividing a physical page by N (N being a natural number) thereby determining a print area corresponding to a logic page;

an enlargement/reduction step of determining the enlargement/reduction ratio for each logic page based on the size of each print area and page information, including page size information and page orientation information, of each logic page, and effecting an enlargement/reduction with the enlargement/reduction ratio corresponding to said logic page; and a print data generation step of arranging the print information of each enlarged or reduced logic page in said each print area, and generating the print data to be sent to a printing apparatus, wherein if a plurality of logic pages to be arranged on one physical page have different sheet sizes or sheet orientation, said enlargement/reduction means determines different enlargement/reduction ratios for the plurality of logic pages.

19. A memory medium according to claim 18, wherein the program further comprises:

a storage step of storing the page information of said logic page; and a sheet determination step of determining the size and orientation of the physical page, based on page size information contained in the page information of said logic page;

wherein said enlargement/reduction step is adapted to calculate the enlargement/reduction ratio based on said stored page information and said determined sheet size.

20. A memory medium according to claim 19, wherein said sheet determination step is adapted to determine an optimum sheet size based on the page information of N pages to be printed on a same sheet.

21. A memory medium according to claim 19, wherein said sheet determination step is adapted to determine the sheet size based on an externally entered instruction.

22. A memory medium according to claim 19, wherein said sheet determination step is adapted, in case of two-side printing, to determine an optimum sheet size based on the page information of 2N pages to be printed on a same sheet.

23. A memory medium according to claim 18, wherein said enlargement/reduction step is adapted to employ a largest enlargement/reduction ratio not causing overflow from each print area, without changes in the page size and the height/width ratio of the original logic page.

24. A memory medium according to claim 18, further comprising:

a storage step of temporarily storing the data in an intermediate code format different from that of the print data; and a preparation step of preparing the print data based on said temporarily stored data.

25. A memory medium storing a program executed in an information processing apparatus as a host computer for generating print data by executing layout of a print sheet, the program comprising:

a reception step of receiving, from drawing means dependent on the operating system (OS), common print information generated from drawing data generated by an arbitrary application;

an area determination step of dividing a physical page by N (N being a natural number) thereby determining a print area corresponding to a logic page;

an enlargement/reduction step of determining the enlargement/reduction ratio for each logic page based on the size of each print area and page information of each logic page, and effecting an enlargement/reduction with the enlargement/reduction ratio corresponding to said logic page; and a print data generation step of arranging the print information of each enlarged or reduced logic page in said each print area, and generating the print data to be sent to a printing apparatus, wherein said area determination step is adapted, in case the division number N of the sheet is a multiple of 2 and is not the square of a natural number, not to change the sheet orientation for a sheet of which the longer side is equal to or larger than twice of the shorter side, but to change the sheet orientation for a sheet of which the longer side is less than twice of the shorter side.

26. An information processing apparatus as a host computer for generating print data by effecting layout of a print sheet, comprising:

dispatcher means for receiving common print information from a graphic engine which generates the common print information from drawing data generated by an arbitrary application;

intermediate data conversion means for converting the print information received by said dispatcher means into intermediate data and storing said intermediate data in spool means;

setting means for setting a designation for assigning N logic pages (N being a natural number) to a physical page;

area determination means for dividing the physical page by N to determine a print area corresponding to a logic page and determining the enlargement/reduction ratio for each logic page;

process means for processing the intermediate data stored in said spool means in such a manner that the logic page corresponding to said determined print area is arranged with an enlargement or a reduction in said print area, and outputting the processed data in said drawing data format to the graphic engine; and print data generation means for converting the print information processed and output to the graphic engine by said process means and received by said dispatcher means from the graphic engine into print data consisting of control commands.

27. An apparatus according to claim 26, wherein said drawing data are GDI (graphical device interface).

28. An apparatus according to claim 26, wherein said print information is DDI (device driver interface).

29. An apparatus according to claim 26, wherein said print data are a page description language.

30. A method carried out in an information processing apparatus as a host computer for generating print data by effecting layout of a print sheet, said method comprising:

a receiving step of receiving common print information from a graphic engine which generates the common print information from drawing data generated by an arbitrary application;

an intermediate data conversion step of converting said received information into intermediate data and storing said intermediate data in spool means;

a setting step of setting a designation for assigning N logic pages (N being a natural number) to a physical page;

an area determination step of dividing the physical page by N to determine a print area corresponding to a logic page and determining the enlargement/reduction ratio for each logic page;

a process step of processing the intermediate data stored in said spool means in such a manner that the logic page corresponding to said determined print area is arranged with an enlargement or a reduction in said print area, and outputting the processed data in said drawing data format to the graphic engine; and a print data generation step of converting said received print information processed and output to the graphic engine by said process means and received by said dispatcher means from the graphic engine into print data consisting of control commands.

31. A memory medium storing a program executed in an information processing apparatus as a host computer for generating print data by effecting layout of a print sheet, the program comprising:

a receiving step of receiving common print information from a graphic engine which generates the common print information from drawing data generated by an arbitrary application;

an intermediate data conversion step of converting said received print information into intermediate data and storing said intermediate data in spool means;

a setting step of setting a designation for assigning N logic pages (N being a natural number) to a physical page;

an area determination step of dividing the physical page by N to determine a print area corresponding to a logic page and determining the enlargement/reduction ratio for each logic page;

a process step of processing the intermediate data stored in said spool means in such a manner that the logic page corresponding to said determined print area is arranged with an enlargement or a reduction in said print area, and outputting the processed data in said drawing data format to the graphic engine; and a print data generation step of converting said received print information processed and output to the graphic engine by said process means and received by said dispatcher means from the graphic engine into print data consisting of control commands.

32. An information processing apparatus as a host computer for generating print data by effecting layout of a print sheet, comprising:

dispatcher means for receiving common print information from a graphic engine which generates the common print information from drawing data generated by an arbitrary application;

intermediate data conversion means for converting the print information received by said dispatcher means into intermediate data and storing said intermediate data in spool means;

setting means for setting an enlargement/reduction mode;

process means for processing the intermediate data stored in said spool means in such a manner that the logic page is so enlarged or reduced with the enlargement/reduction ratio of said set enlargement/reduction mode as to be arranged in the physical page and outputting the processed data in said drawing data format to the graphic engine; and print data generation means for converting the print information processed and output to the graphic engine by said process means and received by said dispatcher means from the graphic engine into print data consisting of control commands.

33. An apparatus according to claim 32, wherein said drawing data are GDI (graphical device interface).

34. An apparatus according to claim 32, wherein said print information is DDI (device driver interface).

35. An apparatus according to claim 32, wherein said print data are a page description language.

36. A method carried out in an information processing apparatus as a host computer for generating print data by effecting layout of a print sheet, said method comprising:

a receiving step of receiving common print information from a graphic engine which generates the common print information from drawing data generated by an arbitrary application;

an intermediate data conversion step of converting said received print information into intermediate data and storing said intermediate data in spool means;

a setting step of setting an enlargement/reduction mode;

a process step of processing the intermediate data stored in said spool means in such a manner that the logic page is so enlarged or reduced with the enlargement/reduction ratio of said set enlargement/reduction mode as to be arranged in the physical page and outputting the processed data in said drawing data format to the graphic engine; and print data generation means for converting said received print information processed and output to the graphic engine by said process means and received by said dispatcher means from the graphic engine into print data consisting of control commands.

37. A memory medium storing a program executed in an information processing apparatus as a host computer for generating print data by effecting layout of a print sheet, the program comprising:

a receiving step of receiving common print information from a graphic engine which generates the common print information from drawing data generated by an arbitrary application;

an intermediate data conversion step of converting said received print information into intermediate data and storing said intermediate data in spool means;

a setting step of setting an enlargement/reduction mode;

a process step of processing the intermediate data stored in said spool means in such a manner that the logic page is so enlarged or reduced with the enlargement/reduction ratio of said set enlargement/reduction mode as to be arranged in the physical page and outputting the processed data in said drawing data format to the graphic engine; and print data generation means for converting said received print information processed and output to the graphic engine by said process means and received by said dispatcher means from the graphic engine into print data consisting of control commands.

38. Computer-executable program code stored on a computer readable medium, said computer-executable program code for executing layout of a print sheet, said computer-executable program code comprising:

area determination code to divide a physical page by N (N being a natural number) thereby determining a print area corresponding to a logic page;

enlargement/reduction code to determine the enlargement/reduction ratio for each logic page based on the size of each print area and page information of each logic page, and to effect an enlargement/reduction with the enlargement/reduction ratio corresponding to said logic page; and arrangement code to arrange each enlarged or reduced logic page in said each print area, wherein said area determination code is adapted, in case the division number N of the sheet is a multiple of 2 and is not the square of a natural number, not to change the sheet orientation for a sheet of which the longer side is equal to or larger than twice of the shorter side, but to change the sheet orientation for a sheet of which the longer side is less than twice of the shorter side.

39. Computer-executable program code stored on a computer readable medium, said computer-executable program code carried out in an information processing apparatus as a host computer for generating print data by effecting layout of a print sheet, said computer-executable program code comprising:

code to receive common print information from a graphic engine which generates the common print information from drawing data generated by an arbitrary application;

code to perform intermediate data conversion to convert said received information into intermediate data and to store said intermediate data in spool means;

code to set a designation for assigning N logic pages (N being a natural number) to a physical page;

code to perform area determination to divide the physical page by N to determine a print area corresponding to a logic page and to determine the enlargement/reduction ratio for each logic page;

code to process the intermediate data stored in said spool means in such a manner that the logic page corresponding to said determined print area is arranged with an enlargement or a reduction in said print area, and to output the processed data in said drawing data format to the graphic engine; and code to perform print data generation to convert said received print information processed and output to the graphic engine by said process means and received by said dispatcher means from the graphic engine into print data consisting of control commands.

40. Computer-executable program code stored on a computer readable medium, said computer-executable program code carried out in an information processing apparatus as a host computer for generating print data by effecting layout of a print sheet, said computer-executable program code comprising:

code to receive common print information from a graphic engine which generates the common print information from drawing data generated by an arbitrary application;

code to perform intermediate data conversion to convert said received print information into intermediate data and to store said intermediate data in spool means;

code to set an enlargement/reduction mode;

code to process the intermediate data stored in said spool means in such a manner that the logic page is so enlarged or reduced with the enlargement/reduction ratio of said set enlargement/reduction mode as to be arranged in the physical page and to output the processed data in said drawing data format to the graphic engine; and code to perform print data generation to convert said received print information processed and output to the graphic engine by said process means and received by said dispatcher means from the graphic engine into print data consisting of control commands.

* * * * *

UNITED STATES PATENT AND TRADEMARK OFFICE
CERTIFICATE OF CORRECTION

PATENT NO. : 6,580,521 B1
DATED : June 17, 2003
INVENTOR(S) : Satoshi Nishikawa et al.

It is certified that error appears in the above-identified patent and that said Letters Patent is hereby corrected as shown below:

<u>Column 3,</u>
Line 42, "he" should read -- the --.

<u>Column 8,</u>
Line 60, "generates" should read -- generate --.

<u>Column 9,</u>
Line 54, "despatcher 301" should read -- dispatcher 301 --.

<u>Column 22,</u>
Line 28, "a" should read -- an --; and
Line 41, "less" should read -- less than --.

Signed and Sealed this

Thirteenth Day of January, 2004

JON W. DUDAS
*Acting Director of the United States Patent and Trademark Office*